(12) United States Patent
Johnson et al.

(10) Patent No.: US 7,800,614 B2
(45) Date of Patent: Sep. 21, 2010

(54) EFFICIENT COMMUNICATION IN A CLIENT-SERVER SCENE GRAPH SYSTEM

(75) Inventors: Deron D. Johnson, Newark, CA (US);
Hideya Kawahara, Mountain View, CA (US); Paul V. Byrne, Los Altos, CA (US); Kevin C. Rushforth, San Jose, CA (US); Douglas C. Twilleager, Campbell, CA (US)

(73) Assignee: Oracle America, Inc., Redwood City, CA (US)

( * ) Notice: Subject to any disclaimer, the term of this patent is extended or adjusted under 35 U.S.C. 154(b) by 1476 days.

(21) Appl. No.: 11/054,154

(22) Filed: Feb. 9, 2005

(65) Prior Publication Data

US 2005/0182844 A1  Aug. 18, 2005

Related U.S. Application Data

(60) Provisional application No. 60/545,266, filed on Feb. 17, 2004.

(51) Int. Cl.
G09T 11/20 (2006.01)
(52) U.S. Cl. ...................................... 345/440
(58) Field of Classification Search .................. 345/440
See application file for complete search history.

(56) References Cited

U.S. PATENT DOCUMENTS 5,430,465 A * 7/1995 Sabella et al. ............... 345/601
5,896,139 A * 4/1999 Strauss ........................ 345/440
6,154,215 A * 11/2000 Hopcroft et al. ............. 345/418
6,199,099 B1 * 3/2001 Gershman et al. ........... 709/203

(Continued)

FOREIGN PATENT DOCUMENTS

WO  95-18439  7/1995

OTHER PUBLICATIONS

The blue-c distributed scene graph Martin Naef, Edouard Lamboray, Oliver Staadt, Markus Gross May 2003 EGVE '03: Proceedings of the workshop on Virtual environments 2003 Publisher: ACM.*

(Continued)

*Primary Examiner*—Javid A Amini
(74) *Attorney, Agent, or Firm*—Robert C. Kowert; Meyertons, Hood, Kivlin, Kowert & Goetzel, P.C.

(57) ABSTRACT

A system and method for communicating 3D branch graph data and updates to branch graph data between clients and a display server in a 3D window system. A client locally creates a branch graph. When the client ready to make the branch graph live remote, it sends the branch graph to the display server using at least one batch protocol request. The display server builds a copy of the branch graph and attaches it to a centralized scene graph that it manages. The client may subsequently induce detachment of the branch graph from the scene graph. The client may buffer up changes to the local branch graph when its remote counterpart (in the display server) is not attached to the scene graph. The buffered changes may be sent to the display server using at least one batch protocol request when the client is again ready to make the branch graph live remote.

32 Claims, 10 Drawing Sheets

U.S. PATENT DOCUMENTS

| | | | | |
|---|---|---|---|---|
| 6,266,053 | B1* | 7/2001 | French et al. | 715/255 |
| 6,307,558 | B1* | 10/2001 | Mao | 345/428 |
| 6,370,590 | B1* | 4/2002 | Nitz et al. | 719/317 |
| 6,373,489 | B1* | 4/2002 | Lu et al. | 345/428 |
| 6,570,564 | B1* | 5/2003 | Sowizral et al. | 345/420 |
| 6,711,620 | B1* | 3/2004 | Yoshii et al. | 709/229 |
| 6,859,209 | B2* | 2/2005 | Lavelle et al. | 345/582 |
| 6,995,765 | B2* | 2/2006 | Boudier | 345/428 |
| 7,027,055 | B2* | 4/2006 | Anderson et al. | 345/473 |
| 7,085,683 | B2* | 8/2006 | Anderson et al. | 702/186 |
| 7,170,511 | B2* | 1/2007 | Sowizral et al. | 345/420 |
| 7,170,526 | B1* | 1/2007 | Johnson | 345/582 |
| 7,171,663 | B2* | 1/2007 | Moore et al. | 718/1 |
| 7,184,038 | B2* | 2/2007 | Sowizral et al. | 345/420 |
| 7,250,944 | B2* | 7/2007 | Anderson et al. | 345/419 |
| 7,290,216 | B1* | 10/2007 | Kawahara et al. | 715/762 |
| 7,487,463 | B2* | 2/2009 | Johnson | 715/781 |
| 2001/0055341 | A1* | 12/2001 | Herrmann et al. | 375/240.25 |
| 2003/0011637 | A1* | 1/2003 | Boudier | 345/771 |
| 2004/0059436 | A1* | 3/2004 | Anderson et al. | 700/2 |
| 2004/0090467 | A1 | 5/2004 | Bonura et al. | |
| 2005/0057497 | A1 | 3/2005 | Kawahara | |
| 2005/0060661 | A1 | 3/2005 | Kawahara et al. | |
| 2005/0102636 | A1* | 5/2005 | McKeon et al. | 715/854 |
| 2005/0151747 | A1* | 7/2005 | Kim et al. | 345/506 |
| 2005/0182844 | A1 | 8/2005 | Johnson et al. | |
| 2005/0183083 | A1* | 8/2005 | Mathiske et al. | 718/1 |
| 2005/0204306 | A1 | 9/2005 | Kawahara et al. | |
| 2008/0216094 | A1* | 9/2008 | Anderson et al. | 719/318 |

OTHER PUBLICATIONS

Niklas Elmqvist; "3Dwm: A Platform for Research and Development of Three-Dimensional User Interfaces"; Technical Report No. 2003-04; 2003; 25 pages; Göteborg, Sweden.

European Search Report from Application No. 05250910.6—1527 / 1566754, dated Aug. 7, 2008.

U.S. Appl. No. 11/054,488, filed Feb. 9, 2005.

U.S. Appl. No. 11/054,297, filed Feb. 9, 2005.

Maarten Van Dantzich, George Robertson and Vadim Gorokhovsky; "Application Redirection: Hosting Windows Applications in 3D"; ACM Workshop on New Paradigms in Information Visualization and Manipulation; 1999; pp. 87-91; Kansas City, MO, U.S.A.

* cited by examiner

EFFICIENT COMMUNICATION IN A CLIENT-SERVER SCENE GRAPH SYSTEM

BENEFIT CLAIM

This application claims the benefit of U.S. Provisional Application No. 60/545,266, filed on Feb. 17, 2004, entitled "Efficient Communication in a Client-Server Scene Graph System". Provisional Application No. 60/545,266 is hereby incorporated by reference in its entirety.

BACKGROUND OF THE INVENTION

1. Field of the Invention

This invention is related to the field of client-server communication, and more particularly, to a system and method for sending 3D scene graph data, and updates to scene graph data, between clients and servers.

2. Description of the Related Art

A three-dimensional (3D) window system may include a display server which communicates with one or more clients. The display server maintains a scene graph. The 3D window system allows clients to create scene graph nodes in the display server, connect nodes to other nodes, and to modify the attributes of nodes. Such a 3D window system is described by Elmqvist in Technical Report no. 2003-04, entitled "3Dwm: A Platform for Research and Development of Three-Dimensional User Interfaces", published by the Dept. of Computing Science at Chalmers University of Technology and Göteborg University.

The protocol used by 3Dwm to communicate scene graph information between client and display server has the property that each individual operation (e.g., node creation, node connection, node attribute modification) is sent to the display server as a separate protocol request. In addition to the unique information contained in each protocol request, a protocol request contains certain control information to indicate what the request is and how the display server should satisfy the request. This extra information is called the "request packet header". This extra information increases the number of bytes of data in the protocol packet of the request and increases the time required to transmit the request through the communication channel and to process the request in the display server. Thus, improved systems, methods and protocols for communicating scene graph management information between clients and display servers are greatly to be desired, especially systems, methods and protocols that provide decreased protocol overhead and increased performance.

SUMMARY

In one set of embodiments, a method for client-server communication of branch graph information may include:
the client creating a branch graph in a local memory;
the client sending branch graph information specifying the branch graph to a display server in one or more protocol requests including one or more batch protocol requests;
the display server receiving the one or more protocol requests and constructing a copy of the branch graph from the branch graph information; and
the display server attaching the branch graph copy to a scene graph.

In another set of embodiments, a method for client-server communication of branch graph updates may include:
a client locally storing a plurality of records specifying a plurality of changes to a local branch graph;
the client sending the plurality of records to the display server in one or more protocol requests including at least one batch protocol request.

The method may further include the display server receiving the one or more protocol requests, updating a previously detached branch graph by applying the plurality of changes specified by the plurality of records to the previously detached branch graph, and attaching the updated branch graph to a scene graph.

In some embodiments, the display server is part of a 3D window system. The 3D window system displays a collection of three-dimensional (3D) graphical objects on one or more display screens that form a display surface. The graphical objects present a 3D user interface and are managed by a "3D widget toolkit". A distributed scene graph may be used to manage and render 3D widgets on the display surface. In order to provide such a capability, a 3D window system implements the display server process to which client application programs can connect. These clients describe to the display server the position, orientation, appearance, and other attributes of their 3D widgets. The display server may combine the 3D widget descriptions of all the clients together and render them on the display surface. This combination of 3D widget descriptions may be organized into a hierarchical structure called a "scene graph". In this context, the scene graph may be referred to as a "client-server" scene graph because the components in the scene graph originate within clients and are transmitted to the display server for rendering. From time to time, clients may make changes to the scene graph. For example, clients may modify attributes of scene graph objects (called "nodes"), they may create new nodes, or they may delete nodes. Clients transmit such changes to the display server using a scene graph management protocol.

The 3D window system may be configured so that clients are able to make wholesale changes to the display server's scene graph. In other words, a client may buffer up changes to a scene graph in its local memory, and send the buffered changes to the display server as one protocol request, or, as a number of protocol requests where at least one of the protocol requests contains a plurality of scene graph changes. This is in contrast to the conventional methodology of sending a separate protocol request for each change to the state of a scene graph.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The following patent applications are hereby incorporated by reference in their entirety:
(1) U.S. Provisional Application No. 60/545,246, filed on Feb. 17, 2004, entitled "Multiprocess Input Redirection in a 3D Window System", invented by Deron D. Johnson;
(2) U.S. Provisional Application No. 60/545,266, filed on Feb. 17, 2004, entitled "Efficient Communication in a Client-Server Scene Graph System", invented by Johnson, Kawahara, Byrne, Rushforth and Twilleager;
(3) U.S. Provisional Application No. 60/545,241, filed on Feb. 17, 2004, entitled "Window System 2D Graphics Redirection Using Direct Texture Rendering", invented by Deron D. Johnson;
(4) U.S. patent application Ser. No. 11/054,488, filed on Feb. 9, 2005, entitled "Multiprocess Input Redirection in a 3D Window System", invented by Deron D. Johnson; and
(5) U.S. patent Ser. No. 11/054,297, filed on Feb. 9, 2005, entitled "Window System 2D Graphics Redirection Using Direct Texture Rendering", invented by Deron D. Johnson.

A client process communicates with a display server process to achieve the display of a set of three-dimensional objects on one or more screens forming a display surface. The client process and the display server process may execute on the same computer, or alternatively, on different computers coupled through any of a variety of well-known network communication mechanisms.

The computer on which the display server executes may couple to one or more display devices, one or more audio output devices, one or more input devices, and one or more graphics accelerators. Display devices include devices such as monitors, projectors and head-mounted displays. Input devices include devices such as keyboards, mice, joysticks, track balls, game controllers, data gloves, microphones, sensors of physical properties, etc.

Figure 1:
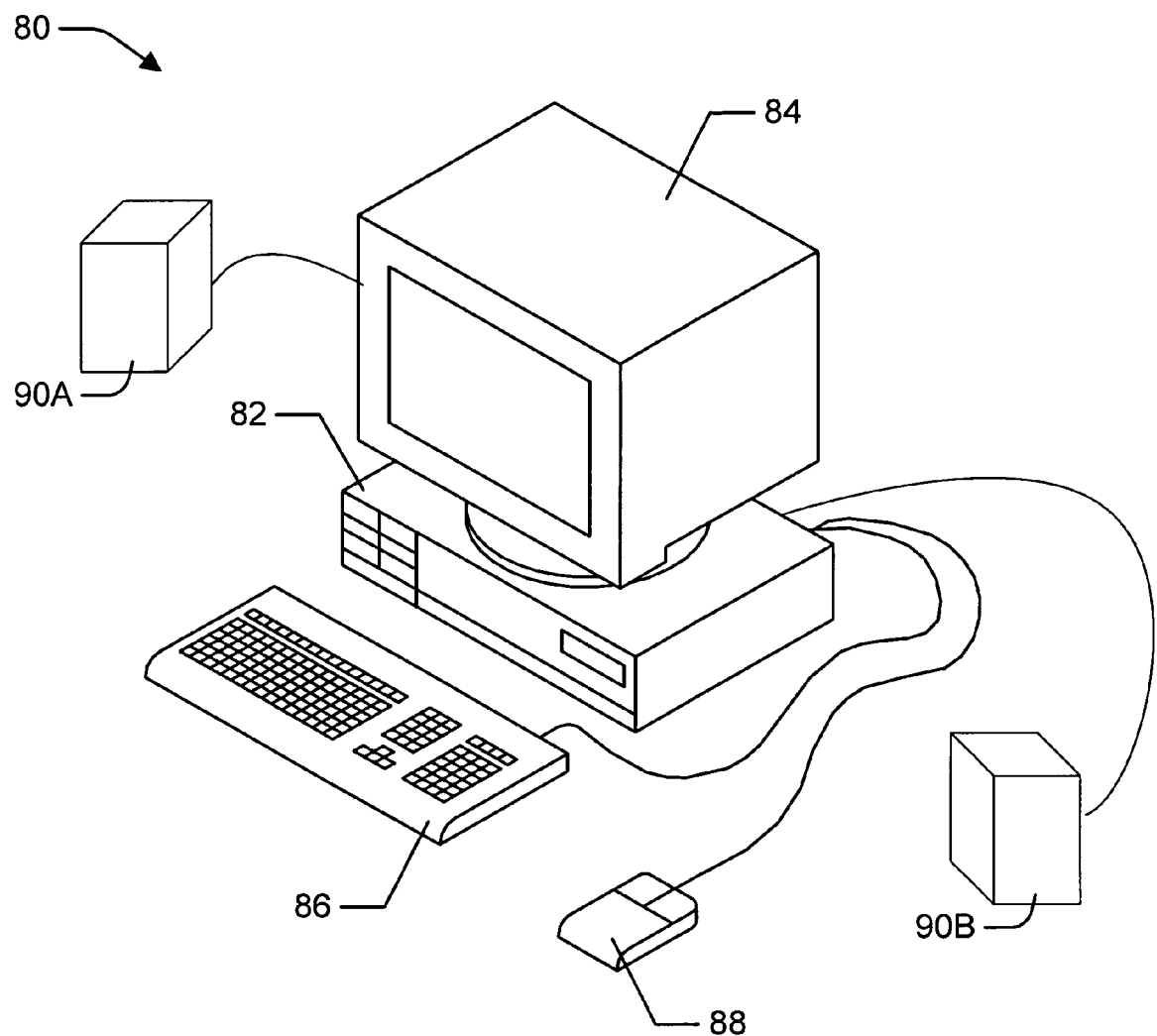
FIG. 1 illustrates one embodiment of a computer system on which a client process and/or a display server process may execute.

FIG. 1 illustrates one embodiment of a computer 80 which may be used to host execution of the display server and/or the client process. Computer 80 may include system unit 82, monitor 84, keyboard 86, mouse 88, speakers 90A and 90B, and a graphics accelerator (not shown).

Figure 2:
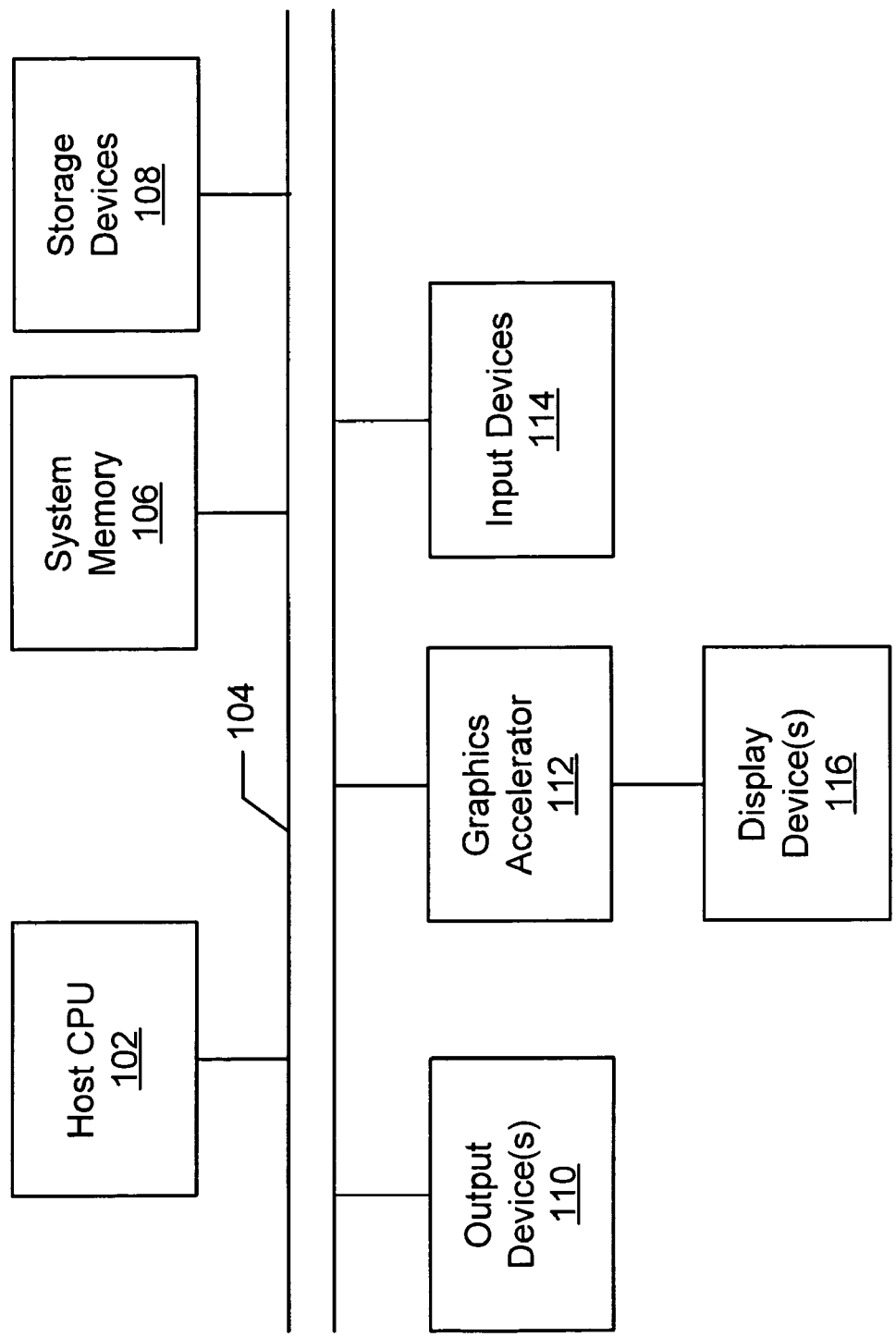
FIG. 2 illustrates one embodiment of a computer system in which the client process and/or the display server process may execute.

FIG. 2 is a block diagram for a computer 100 that may be used to host execution of the display server and/or the client process. Computer 100 includes one or more central processing units (CPUs) 102, a system memory 106, storage devices 108 (such as CD-ROM drives, hard drives, floppy drives, tape drives), one or more output devices 110 such as speakers, a graphics accelerator 112, one or more input devices 114 (such as a mouse, a keyboard, physical sensors) and one or more display devices 116. The graphics accelerator 112 drives the display devices 116. These devices and system components may be coupled through a system bus 104.

Figure 3:
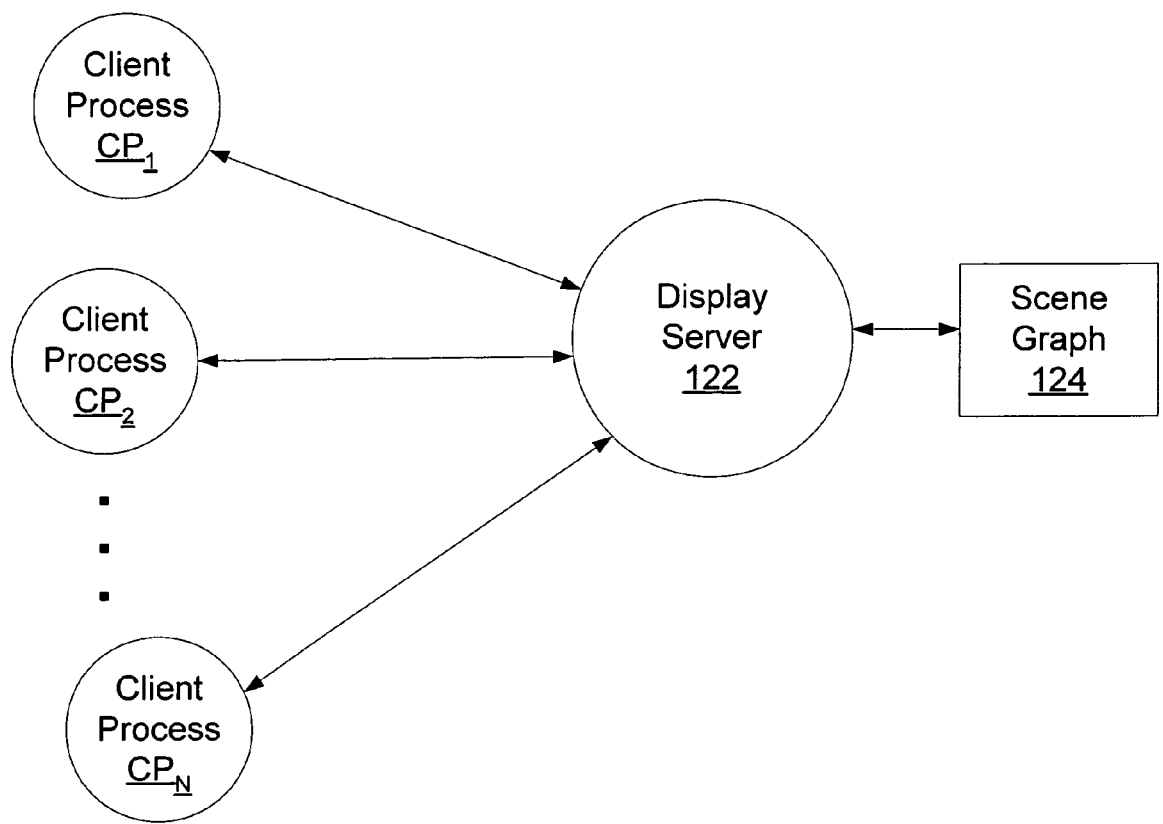
FIG. 3 illustrates multiple clients interacting with a display server which controls a scene graph.

The display server, denoted by item number 122 in FIG. 3, may serve a number of client processes $CP_1, CP_2, \ldots, CP_N$, where N is a positive integer. Some of the client processes may execute on the same computer as the display server. Others of the client processes may execute on other computers which couple to the display server's computer through any of a variety of well-known communication mechanisms.

The clients send protocol requests to the display server 122 and the display server sends protocol replies to the clients. Each protocol request includes a header and a body. The header includes information about the type and size of data in the request.

The display server 122 maintains a scene graph 124 within an address space belonging to the display server. The scene graph may contain a number of attached branch graphs. The branch graphs are created by the client processes and transferred to the display server for attachment to the scene graph (e.g., to a root branch group node of the universe object corresponding to the scene graph).

Part of the on-going action of the display server is to repeatedly traverse the scene graph, and thereby, render graphical objects described by the scene graph. (Scene graphs and their traversal to induce object rendering are familiar concepts to those skilled in the art of computer graphics and especially to users of Java3D™.) Thus, the operation of attaching a branch graph to the scene graph implies that the graphical objects described by the branch graph will become visible on the display surface. Conversely, the operation of detaching a branch graph from the scene graph implies that the graphical objects described by the branch graph will become invisible.

Client processes may create many of their branch graph nodes before invoking the connection of these branch graph nodes to the root of the scene graph which is owned and managed by the display server. During the creation process, there is no need to send individual node creation protocol requests to the display server. Thus, in one set of embodiments, when a client process asserts node creation protocol requests, objects can be created within the client address space instead of sending the individual node creation protocol requests to the display server.

Initially, the scene graph is empty, i.e., contains no branch graphs. A client process may create a branch graph within an address space belonging to the client process. This branch graph which is stored in the client address space is referred to herein as the client branch graph. The term "local branch graph" is used as a synonym for client branch graph. When the client process is ready for a copy of the client branch graph to be transferred to the display server and attached to the scene graph, the client process may attach the client branch graph to a "proxy universe" which has been instantiated in the client's address space. The proxy universe may be interpreted as an object (in the sense of object-oriented programming) and serves to represent the remote universe (i.e., the universe of the scene graph owned by the display server).

Attachment of the client branch graph to the proxy universe invokes a transfer method that sends a copy of the client branch graph to the display server in one or more protocol requests including one or more batch protocol requests. As used herein the term "batch protocol request" is a protocol request which contains data specifying a plurality of branch graph nodes, or, a plurality of changes to the state of a branch graph. (In one embodiment, the copy of the client branch graph is sent to the display server in a single batch protocol request.) The display server receives the one or more protocol requests, constructs a remote branch graph which is a copy of the client branch graph from the payload data of the one or more protocol requests, and attaches the remote branch graph to the scene graph, e.g., to the root branch group node of the universe corresponding to the scene graph. The display server may send a message to the client process confirming that attachment of the remote branch graph has been achieved. While the remote branch graph is attached to the scene graph, the client branch graph is said to be "live remote".

The client process may make changes to the client branch graph while the client branch graph is live remote. For example, the client process may:
 change the attributes of a node of the client branch graph;
 add a node to the client branch graph; or
 detach a node from the client branch graph.

In one set of embodiments, each change to the client branch graph when it is live remote may induce the transfer of a separate protocol request to the display server so that the corresponding change may be made to the remote branch graph.

If the client process changes the attributes of a node of the client branch graph when it is live remote, a node modification method of the client scene graph library may send a specification of the attribute changes to the display server in a protocol request. The display server may receive the protocol request and make the corresponding attribute changes to the corresponding node of the remote branch graph. The client scene graph library is a set of client routines that form the client's interface to the scene graph.

If the client process adds a node to the client branch graph when it is live remote, a node addition method of the client scene graph library may send a specification of the node to the display server in a protocol request. The display server may receive the protocol request and add the node to the remote branch graph.

If the client process detaches a node from the client branch graph when it is live remote, a node deletion method of the client scene graph library may send an identification of the node to the display server in a protocol request. The display server may receive the protocol request and detach the corresponding node from the remote branch graph.

When the client process is ready for the client branch graph to be made not live remote (i.e., for the remote branch graph to be detached from the scene graph), the client process may detach the client branch graph from the proxy universe. In response to detaching the client branch graph from the proxy universe, a detachment method of the proxy universe sends a detachment request to the display server. In response to receiving the detachment request, the display server detaches the remote branch graph from the scene graph, e.g., from the root branch group node of the universe corresponding to the scene graph, and sends a copy of the remote branch graph to the client process, e.g., in one or more protocol replies including one or more batch protocol replies. As used herein the term "batch protocol reply" refers to a protocol reply which contains data specifying a plurality of branch graph nodes, or, a plurality of changes to the state of a branch graph. Similarly to a protocol request, a protocol reply includes a header and a body. The client process may receive the copy of the remote branch graph and store it in the client address space. This stored copy may then be used as the current state of the client branch graph.

In one embodiment, the display server's copy of the remote branch graph may be discarded (e.g., marked for garbage collection) after it has been detached from the scene graph and sent to the client process.

Note that the client process is not the only agent that can make changes to the state of the remote scene graph. The client process may add "behavior nodes" to the remote branch graph. These behavior nodes act as programs running in individual threads of execution. These programs can also make changes to the remote branch graph. Thus, the operation of sending a copy of the remote branch graph to the client process upon detachment of the remote branch graph from the scene graph allows the client process to obtain the most up-to-date copy of the remote branch graph.

After the client branch graph has been made not live remote, the client process may then make any desired changes to the client branch graph in the client address space. When the client process is again ready for the client branch graph to be made live remote, the client process may attach the client branch graph to the proxy universe. In one embodiment, this act of attaching the client branch graph to the proxy universe induces transfer of a copy of the branch graph from the client address space to the display server in one or more protocol requests including one or more batch protocol requests and attachment of the branch graph copy to the display server's scene graph as described above. The display server sends a message confirming to the client process that the branch graph has been made live remote.

In one set of embodiments, the client scene graph library may be configured to store data sets specifying corresponding changes to the client branch graph in a local buffer, i.e., a buffer in the client address space. (There is no requirement that the local buffer be a contiguous block of memory in the client address space. The form of the local buffer may vary from one embodiment to the next.) A number of such data sets may be accumulated in the local buffer until a synchronization condition occurs. Examples of a synchronization condition occurring include (a) the client making the local branch graph live remote, (b) the client explicitly asserting a synchronization request using an API routine of the client scene graph library, or, (c) the local buffer becoming full. In response to a synchronization condition occurring, the client branch graph may be synchronized with the remote branch graph, i.e., the data sets in the local buffer may be sent to the display server in one or more protocol requests including one or more batch protocol requests so that the display server may effectuate the changes specified by the data sets on the remote branch graph. (In one embodiment, the data sets in the local buffer are sent to the display server in a single batch protocol request.) Sending a batch protocol request containing N data sets may be more efficient than sending N protocol requests each containing a single data set when N is greater than or equal to two since each protocol request includes a request header.

The buffering of changes as described above may be performed when the client branch graph is not live remote. Thus, when the client process makes changes to the client branch graph, the data sets specifying the changes are stored into the local buffer. When the client process subsequently makes the client branch graph live remote by attaching the client branch graph to the proxy universe, the client branch graph may be synchronized with the remote branch graph as follows. The data sets in the local buffer are transferred to the display server in one or more protocol requests including one or more batch protocol requests. The display server receives the one or more protocol requests, extracts the data sets from the one or more protocol requests, applies the changes specified by the data sets to a copy of the remote branch graph (i.e., a copy that the display server saved at the time of the most recent detachment), and attaches this updated remote branch graph to the scene graph.

In one embodiment, the buffering of changes may also be performed when the client branch graph is live remote. Thus, when the client process makes changes to the client branch graph in its live remote state, the data sets specifying the changes may be stored into the local buffer, and synchronization of the client branch graph with the remote branch graph may be performed in response to a synchronization condition such as an explicit client command or when the local buffer becomes full. In this case, synchronization may be performed as follows. The data sets in the local buffer are transferred to the display server in one or more protocol requests including one or more batch protocol requests. The display server receives the one or more protocol requests, extracts the data sets from the one or more protocol requests, applies the changes specified by the data sets to the remote branch graph (which, by definition of the live remote state, is already attached to the scene graph).

In some embodiments, the client scene graph library may have a global state variable, controlled by the client process, that determines whether the client scene graph library operates in a buffered mode or an unbuffered mode. In the buffered mode, the client scene graph library performs buffering as described above when the client branch graph is not live remote (and, in one embodiment, also when the client branch graph is live remote). In the unbuffered mode, the client scene graph library sends each change to the client branch graph to the display server in a separate protocol request.

When the client branch graph is not live remote, a transition of the global state variable from buffered mode to unbuffered mode may induce synchronization of the client branch graph with the remote branch graph.

In some circumstances, when the client branch graph is live remote, it may be desirable to enable buffering of changes for some nodes and disable buffering of changes for other nodes of the client branch graph. Thus, in one embodiment, each node of the client branch graph may include a BufferedChanges attribute that determines whether buffering is to be employed for that node when the client branch graph is live remote. If the BufferedChanges attribute of a node is equal to the value TRUE, any change to the state of that node in the client branch graph induces the storage of a data set specifying the change into the local buffer. If the BufferedChanges attribute of the node is equal to the value FALSE, each change to the state of that node in the client branch graph is sent as a separate protocol request to the display server. Thus, the client process may arbitrarily specify which nodes of the client branch graph are to be treated in a buffered fashion when the client branch graph is live remote. The client branch graph may be synchronized with the remote branch graph in response to any of one or more synchronization conditions being true (such as when explicitly commanded to do so by the client process or when the local buffer becomes full).

In one embodiment, each node of the client branch graph has an associated list of the state change commands that have been applied to the node since the client branch graph was last synchronized with the remote branch graph. In this embodiment, "synchronizing the client branch graph with the remote branch graph" involves traversing the nodes of the client branch graph, packaging the non-empty associated lists into one or more protocol requests including one or more batch protocol requests and sending the one or more protocol requests to the display server. In this embodiment, the local buffer may be interpreted as including a union of the associated lists. The display server receives the one or more protocol requests, extracts the state change commands from the protocol requests, and applies the state change commands to the corresponding nodes of the remote branch graph.

In another embodiment, each node of the client branch graph has an associated NodeChanged flag to indicate whether or not the node has been changed (or has been created) since the last synchronization of the client branch graph with the remote branch graph. The NodeChanged flag of a node is set to TRUE when a change is made to the node. In this embodiment, "synchronizing the client branch graph with the remote branch graph" may include traversing the client branch graph, packaging the entire node state of those nodes having NodeChanged equal to TRUE into one or more protocol requests including one or more batch protocol requests, and sending the one or more protocol requests to the display server. In this embodiment, the local buffer may be interpreted as including a union of those nodes in the client branch graph that have been changed since the last synchronization. The display server receives the one or more protocol requests, extracts the included nodes, and updates the remote branch graph with the included nodes.

A plurality of client processes executing on the same computer or different computers may interact with the display server using the various mechanisms described above.

The display server may be a multi-threaded process. One set of threads may be responsible for traversing the scene graph or portions of the scene graph to induce 3D object rendering. Other threads may be responsible for functions such as branch graph attachment, branch graph detachment, updating of branch graphs, garbage collection and so on. The computer system on which the display server executes may include one or more processors. If this computer system includes more than one processor, threads of the display server may be distributed among the processors to gain the benefit of parallel execution.

Figure 4:
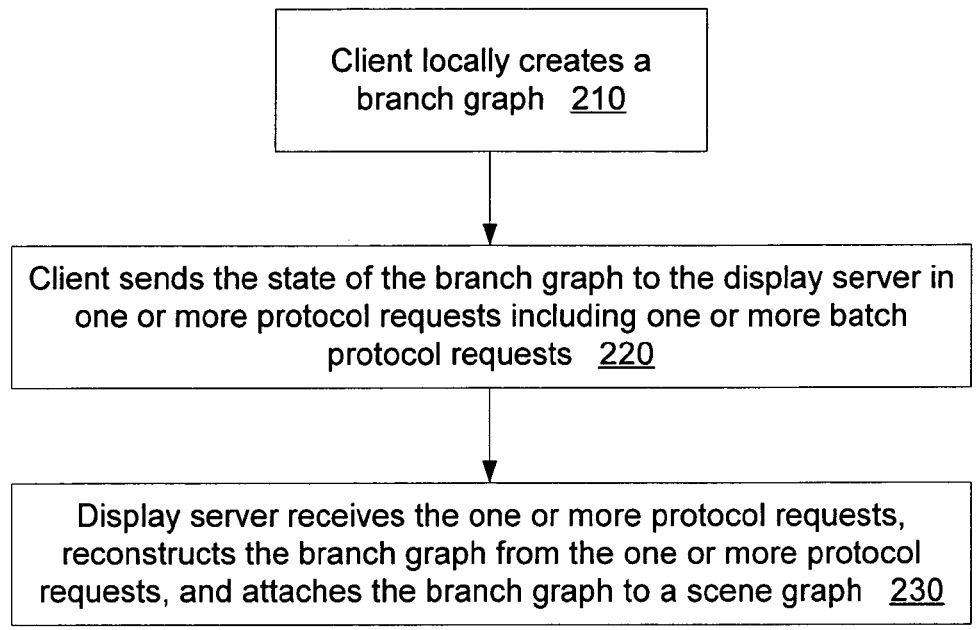
FIG. 4 illustrates one set of embodiments of a method for communicating a branch graph to a display server for attachment to a scene graph.

FIG. 4 illustrates one set of embodiments of a method for communicating a branch graph to a display server. In step 210, the client process locally creates a branch graph. The term "locally creates" means that the branch graph is created within memory that has been assigned to or belongs to the client process. In step 220, the client process sends the state of the branch graph to the display server in one or more protocol requests including one or more batch protocol requests. In step 230, the display server receives the one or more protocol packets, reconstructs the branch graph from the one or more protocol packets, and attaches the branch graph to a scene graph.

Figure 5:
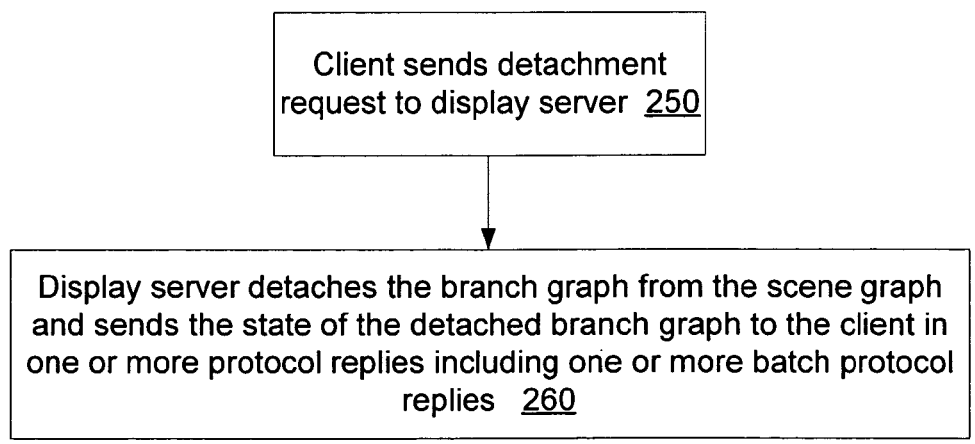
FIG. 5 illustrates one set of embodiments of a method for performing a branch graph detachment.

FIG. 5 illustrates one set of embodiments of a method for executing a branch graph detachment in a client-server environment. In step 250, the client process sends a detachment request to the display server. The detachment request specifies the branch graph which is to be detached from the scene graph. In step 260, the display server receives the detachment request, detaches the requested branch graph from the scene graph, and sends the state of the detached branch graph to the client in one or more protocol replies including one or more batch protocol replies.

Figure 6:
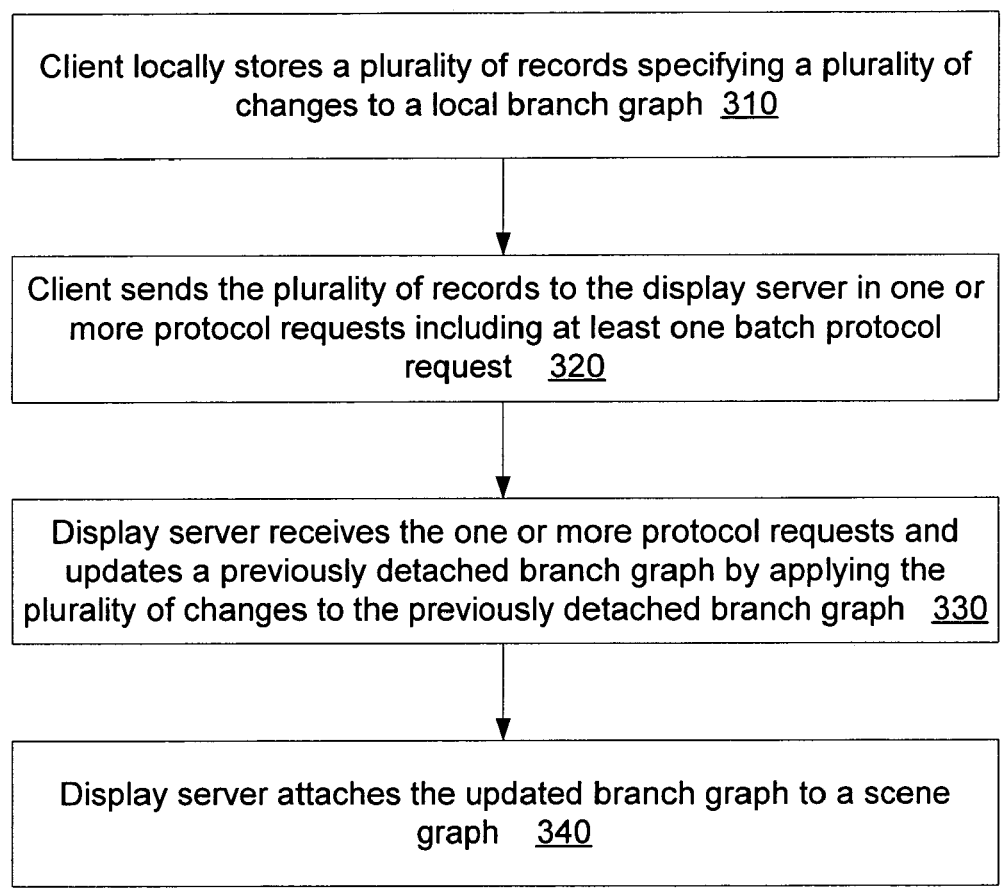
FIG. 6 illustrates one set of embodiments of a method for updating a previously detached branch graph (stored by the display server) and making the updated branch graph remote live.

FIG. 6 illustrates one set of embodiments of a method for updating a previously detached branch graph.

In step 310, a client locally stores a plurality of records specifying a plurality of changes to a local branch graph. The term "locally stores" means that the records are stored in a memory that has been assigned to the client.

In step 320, the client sends the plurality of records to the display server in one or more protocol requests including at least one batch protocol request.

In step 330, the display server receives the one or more protocol requests and updates a previously detached branch graph by applying the plurality of changes specified by the plurality of records to the previously detached branch graph.

In addition, the display server may attach the updated branch graph to a scene graph (as indicated in step 340), thus making the branch graph remote live.

Figure 7:
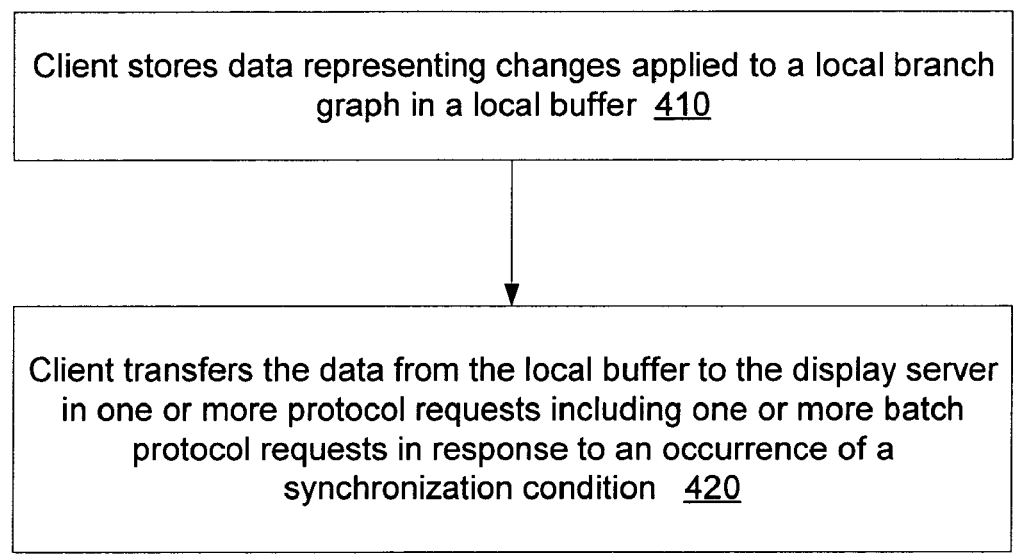
FIG. 7 illustrates one set of embodiments of a method for communicating branch graph changes to a display server.

FIG. 7 illustrates one set of embodiments of a method for communicating local branch graph changes to a display server.

In step 410, the client stores data representing changes applied to a local branch graph in a local buffer.

In step 420, the client transfers the data from the local buffer to the display server in one or more protocol requests including one or more batch protocol requests in response to an occurrence of a synchronization condition. The display server receives the one or more protocol requests, extracts the data from the protocol requests, and applies the changes represented by the data to a corresponding remote branch graph.

The synchronization condition may be an occurrence of an explicit client request for synchronization, or, an occurrence of client request to switch from a buffered mode of operation to an unbuffered mode of operation. After switching to the unbuffered mode, the client may transfer each change applied to the local branch graph in a separate protocol request to the display server.

The synchronization condition may also be an occurrence of a client request to make the local branch graph live remote. After the local branch graph has been made live remote, the client may transfer each change applied to the local branch graph in a separate protocol request to the display server.

In one embodiment, the data representing the changes applied to the local branch graph may include the contents of nodes in the local branch graph which have been modified since the local branch graph was last synchronized with the remote branch graph.

In another embodiment, the data representing the changes may include, for each node of the local branch graph that has been modified since the local branch graph was last synchronized with the remote branch graph, (a) a list of node attributes which have changed and (b) values of the attributes indicated by the list. The data may also include a list of identifiers identifying nodes and subgraphs that have been removed from the local branch graph. The data may further include a list of nodes and subgraphs that have been added to the local branch graph.

Figure 8:
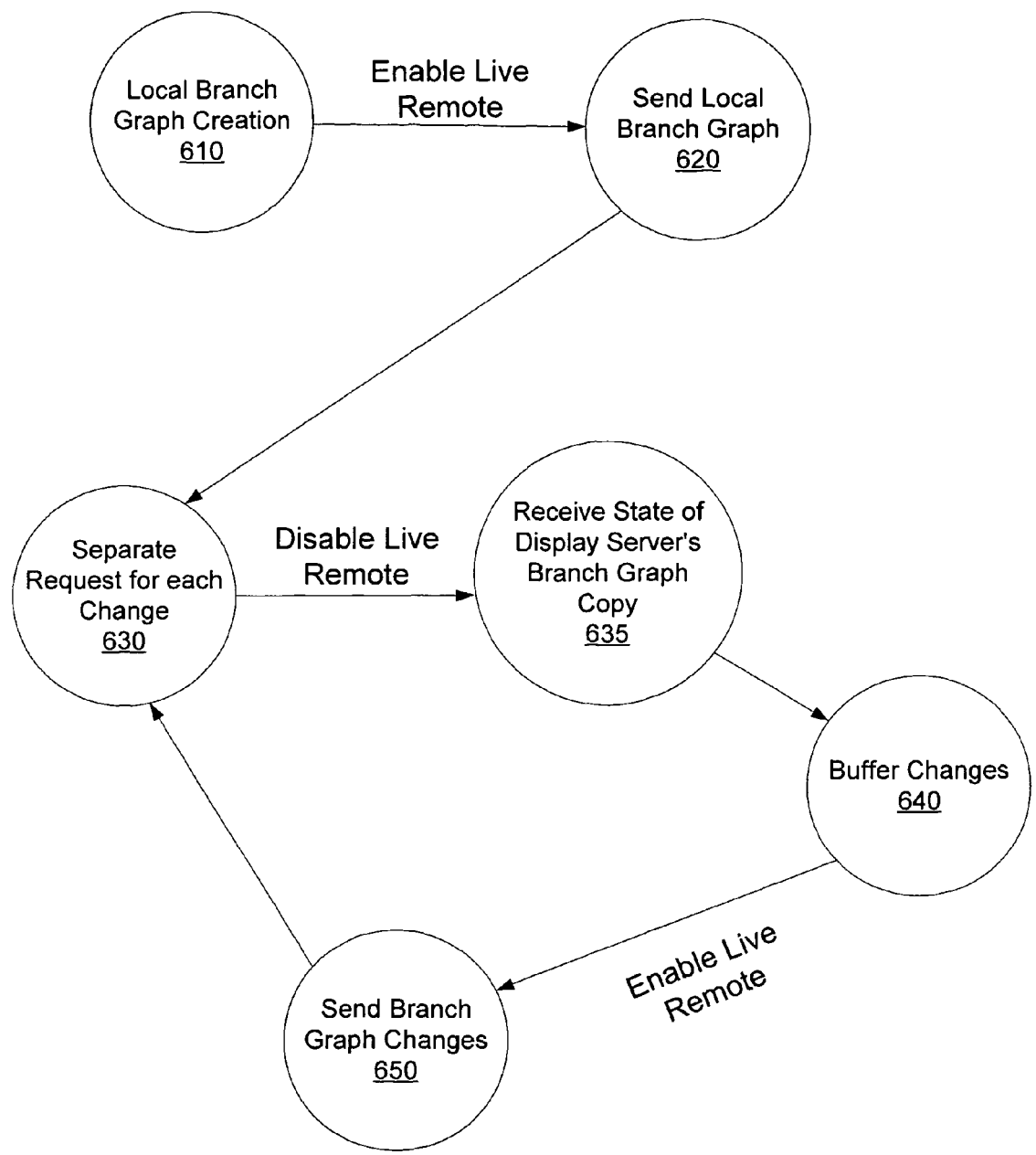
FIG. 8 illustrates a state diagram for one set of embodiments for client-side operation.

FIG. 8 illustrates a state diagram for one set of embodiments of client operation. In a state 610, the client creates a local branch graph in local memory. In response to the client's enabling of the live remote state (e.g., by attaching the local branch graph to a proxy universe), the client transitions to state 620.

In state 620, the client sends the state of local branch graph to the display server using at least one batch protocol request, and then, transitions to the state 630.

In state 630, the client sends a separate protocol request for each change to the local branch graph. In response to a disabling of the live remote state, the client transitions to state 635.

In state 635, the client receives from the display server the state of the display server's copy of the branch graph, and then transitions to state 640.

In state 640, the client buffers up changes to the local branch graph and does not send the changes to the display server. In response to an enabling of the live remote state, the client transitions to state 650.

In state 650, the client sends the buffered branch graph changes to the display server using at least one batch protocol request, and then, transitions to the state 630.

Figure 9:
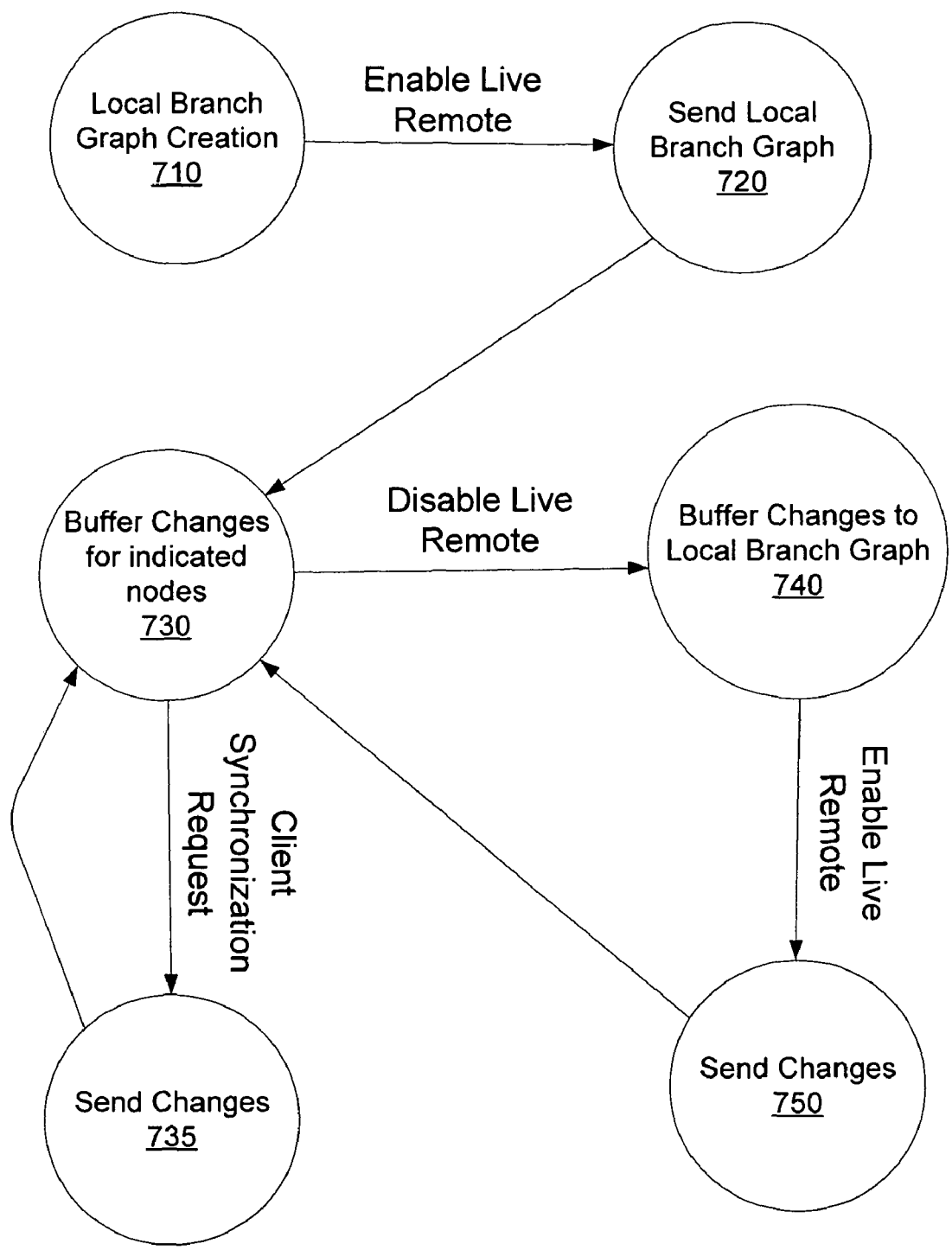
FIG. 9 illustrates a state diagram for another set of embodiments for client-side operation.

FIG. 9 illustrates a state diagram for another set of embodiments of client operation. In a state 710, the client creates a local branch graph in local memory. In response to an enabling of the live remote state, the client transitions to state 720.

In state 720, the client sends the local branch graph to the display server using at least one batch protocol request, and then, transitions to the state 730.

In state 730, the client buffers up changes for the nodes in the local branch graph that have BufferedChanges flag equal to true. These buffered changes are not sent to the display server. For nodes that have the BufferedChanges flag set equal to false, changes are immediately sent to the display server according to the separate packet policy, i.e., each change to such a node is sent in a separate protocol packet to the display server. In response to a disabling of the live remote state, the client transitions to state 740.

In state 740, the client buffers up all changes to the local branch graph (not merely changes to the nodes that have BufferedChanges equal to true) and does not send the changes to the display server. In response to an enabling of the live remote state, the client transitions to state 750.

In state 750, the client sends the buffered branch graph changes (including those accumulated in states 730 and 740) to the display server using at least one batch protocol request, and then, transitions to the state 730.

From state 730, an explicit client request for synchronization of the client branch graph with the remote branch graph induces a transition to state 735. In state 735, the client sends the buffered changes to the display server using at least one batch protocol request, and then, transitions to state 730.

VARIOUS EMBODIMENTS

As described above, the display server may interact with a number of client applications. A client application may create many of its branch graph nodes before invoking the connection of these branch graph nodes to the root of the scene graph which is owned and managed by the display server. During the creation process, there is generally no need to send individual node creation protocol requests to the display server. Thus, in one set of embodiments, when the client application creates branch graph nodes, objects are created within the client address space instead of sending individual node creation protocol requests to the display server. Such nodes created within the client address space are referred to herein as "client-side nodes". A graph of the client-side nodes is called a "client branch graph". While the client branch graph is being created, the client does not send individual node creation protocol requests to the display server. When the client is ready for a copy of the client branch graph to be attached to the display server's scene graph, the state of the client branch graph (i.e. the state of its nodes, connectivity between the nodes, etc.) may be packaged up into a single protocol request and sent to the display server.

The display server receives the protocol request, constructs a remote branch graph (which is a copy of the client branch graph) from the data delivered in the protocol request, and attaches this copy to the scene graph. When the remote branch graph is attached to the scene graph, the client branch graph is said to be "live remote."

During the time the client branch graph is live remote, when the client makes changes to the client branch graph (e.g., modifies node attributes, adds a node or a subgraph, or removes a node or a subgraph), each individual change may be packaged up as an individual protocol request and sent to the display server so that the display server can make the corresponding change to the remote branch graph.

A client can make the client branch graph not live remote by invoking detachment of the root node of the remote branch graph from the scene graph root node. At that time, the state of the remote branch graph held in the display server may be packaged up and sent to the client. This remote branch graph state includes the modifications made to the remote branch graph while it was attached to the scene graph, and, may be used to update the state of the client branch graph.

Starting from this updated state, the client may again make changes to nodes in the client branch graph. These changes are not immediately sent to the display server. Rather, they are buffered up and sent in a single protocol request when the client branch graph is subsequently made live remote. The client branch graph is visible only when it is live remote, that is, when it's remote counterpart is attached to the display server's scene graph. Because of this, changes made to the client branch graph are not made visible until the client branch graph is made live remote again.

In one embodiment, the client explicitly specifies the node in the scene graph to which the branch group node of the remote branch graph is to be attached. In another embodiment, the client application does not specify a node, and a window manager (running in the same process as, or, in a different process from, the display server) determines, using some policy, where to attach the remote branch graph.

When a client branch graph is made not live remote (i.e., when its remote counterpart is detached from the scene graph), its nodes are no longer rendered on the display surface; and thus, the graphical objects represented by the nodes disappear from the user's view. In some embodiments, it is desirable to allow clients to make buffered, wholesale changes to a branch graph while it remains visible on the display surface. Thus, in some embodiments, a method is provided for making such buffered changes while a client branch graph is live remote. A client may maintain a new type of node attribute, called the BufferedChanges attribute, for each node in a branch graph. The BufferedChanges attribute is a Boolean attribute whose values are true or false. The default value is false. When the BufferedChanges attribute of a node is false, the client sends each individual modification to the state of the node as a separate protocol request to the display server. When the BufferedChanges attribute of a node is true, the client buffers modifications made to the state of the node, including the addition or removal of child nodes. Each node may provide a method called SendChanges which, when invoked, sends any existing buffered changes to the display server. In addition, if the client changes the BufferedChanges attribute from true to false, and there are pending changes which have not been sent, these changes are now sent to the display server.

Buffered & Unbuffered Mode Operation in One Set of Embodiments

In one set of embodiments, the scene graph library has a Buffering Mode state variable which controls its behavior of sending local branch graph changes to the display server. The scene graph library provides an API routine which allows the client to specify the buffering mode. There are two possible states of the Buffering Mode state variable: Buffered Mode and Unbuffered Mode. By default, the buffering mode state variable is set to Buffered Mode.

Buffered Mode Operation

When the state of the scene graph library is equal to "Buffered Mode", changes made by the client to the local branch graph are not immediately sent to the display server. Rather, they are sent in response to certain synchronization conditions. (See the section below entitled "Summary: When Changes are Sent to the Display Server in Buffered Mode".) Specifically, the scene graph library performs the following behavior when the client requests some change to the branch graph. There are three different cases.

Case 1: The branch graph has been created locally within the client but has not yet been sent to the display server.

Summary: In this case, changes requested by the client are applied to the local branch graph and are not communicated to the display server until one of the synchronization conditions is met.

A. Node Attribute Change (to an individual node in a local branch graph):

When the client requests modification of an attribute of some node in a local branch graph, the change is applied to the local node. No communication with the display server is generated in response to this client request.

B. Node Attribute Query (from an individual node in a local branch graph):

When the client queries an attribute of some node in a local branch graph, the values of the queried attribute of the local node are returned to the client. No communication with the display server occurs in response to this node state query.

C. Node Addition: (of an individual node to be added to a local branch graph):

When the client requests the addition of a node to a local branch graph, the scene graph library connects the new node to the requested parent node in the local branch graph. No communication with the display server occurs in response to this node addition request.

D. Subgraph Addition: (of an a multi-node subgraph to be added to a local branch graph):

When the client requests the addition of a subgraph to the local branch graph, the scene graph library connects the root node of the new subgraph to the requested parent node in the local branch graph. No communication with the display server occurs in response to this subgraph addition request.

E. Node Removal: (of an individual node to be removed from a local branch graph):

When the client requests the removal of a node from a local branch graph, the scene graph library disconnects the node from its current parent node in the local branch graph. The node's memory may be returned to client's memory heap (or made subject to garbage collection). No communication with the display server occurs in response to this node removal request.

F. Subgraph Removal: (of an a multi-node subgraph to be removed from local branch graph):

When the client requests the removal of a subgraph from a local branch graph, the scene graph library disconnects the root node of the subgraph from the requested parent node in the local branch graph. No communication with the display server occurs in response to this subgraph removal request.

G. Enabling the Live Remote State: (making an entire local branch live remote):

When the client makes an entire local branch graph live remote (e.g., by attaching it to the local ProxyUniverse object), the state of the local branch graph is sent to the display server in one or more protocol requests including one or more batch protocol requests. Since this is the first time the display server will have seen this branch graph, the entire local branch graph is serialized and the serialized representation is sent to the display server in one or more protocol requests including one or more batch protocol requests. The display server reconstitutes the branch graph within its address space by deserializing the serialized representation contained in the one or more protocol requests. This branch graph is called the remote branch graph. The display server then attaches the remote branch graph to the root node of the remote scene graph. The local branch graph is now said to be "live remote."

Case 2: The branch graph has previously been sent to the display server but is not currently live remote.

Summary: In this case, changes requested by the client are applied to the local branch graph and recorded for later transmission to the display server.

A. Node Attribute Change (to an individual node in a local branch graph):

When the client requests modification of an attribute of some node in a local branch graph, the change is applied to the local node, but not communicated to the display server. In one set of embodiments, a record of the attribute change may be saved. This record will be transmitted to the display server at a later time. In some embodiments, the scene graph library may mark the local node as having been changed (e.g., by setting a flag associated with the local node).

B. Node Attribute Query (from an individual node in a local branch graph):

When the client queries an attribute of some node in local branch graph, the queried values of the attribute are returned from the local node.

C. Node Addition: (of an individual node to be added to a local branch graph):

When the client requests the addition of a node to a local branch graph, the scene graph library connects the new node to the requested parent node in the local branch graph. In some embodiments, a record of the node addition may be made. This record will be transmitted to the display server at a later time.

D. Subgraph Addition: (of an a multi-node subgraph to be added to a local branch graph):

When the client requests the addition of a subgraph to a local branch graph, the scene graph library connects the new subgraph to the requested parent node in the local branch graph. In some embodiments, a record of the subgraph addition may be made. This record will be transmitted to the display server at a later time.

E. Node Removal: (of an individual node to be removed from a local branch graph):

When the client requests the removal of a node from a local branch graph, the scene graph library disconnects the node from its parent node in the local branch graph. In some embodiments, a record of the node removal may be made. This record will be transmitted to the display server at a later time.

F. Subgraph Removal: (of an a multi-node subgraph to be removed from local branch graph):

When the client requests the removal of a subgraph from a local branch graph, the scene graph library disconnects the subgraph from its parent node in the local branch graph. In some embodiments, a record of the subgraph removal may be made. This record will be transmitted to the display server at a later time.

G. Enabling the Live Remote State: (making an entire local branch live remote):

When the client makes the local branch graph live remote (e.g., by attaching it to the local ProxyUniverse object) the current state of the local branch graph may be sent to the display server in one or more protocol requests including one or more batch protocol requests.

In one set of embodiments, the entire state of the local branch graph is serialized and the serialized representation is sent to the display server in one or more protocol requests including one or more batch protocol requests. The display server reconstitutes the branch graph within its address space by deserializing the serialized representation. This branch graph is called the remote branch graph. The display server then attaches the remote branch graph to the remote scene graph (e.g., to the root node of remote scene graph). The local scene graph is now said to be "live remote."

In another set of embodiments, a record of changes to local nodes is maintained. (Nodes of the local branch graph are referred to herein as local nodes.) For each changed node, this record may include a list of the attributes which have changed either since the node was first created or since the last time the local branch graph was live remote. When the client makes a local branch graph live remote, for each changed node, this list of changed attributes is sent to the display server, along with the current values of these attributes. The display server makes the corresponding changes to the nodes in the remote branch graph. In addition, a list is maintained of new nodes and subgraphs which have been added to the local branch graph. Each new node or subgraph will be serialized and this serialized representation will be sent to the display server. The display server will deserialize these serialized representations and reconstitute these into remote nodes and remote subgraphs. These will be connected to the appropriate places in the remote branch graph. In addition, a list is maintained of nodes or subgraphs which have been removed from the local branch graph. For each removed node or subgraph, a node (or subgraph) removal command will be sent to the display server. The display server will remove the corresponding node (or subgraph) from the remote branch graph. The transfer to the display server of the lists of changed node attributes, the attribute values identified by these lists, the lists of new nodes and new subgraphs, the node and subgraph removal commands are accomplished using one or more protocol requests including one or more batch protocol requests.

In yet another set of embodiments, the record of changes to local nodes is interpreted differently. For each changed node, this record may include a list of the change operations which the client has requested for the node either since the node was first created or since the last time the client branch graph was live remote. When the client makes a local branch graph live remote, for each changed node, this list of change operations is sent to the display server. The display server applies these operations to the corresponding nodes in the remote branch graph. In addition, a list is maintained of new nodes and subgraphs which have been added to the local branch graph. Each new node or subgraph will be serialized and this serialized representation will be sent to the display server. The display server will deserialize these serialized representations and reconstitute these into remote nodes and remote subgraphs. These will be connected to the appropriate places in the remote branch graph. In addition, a list is maintained of nodes or subgraphs which have been removed from the local branch graph. For each removed node or subgraph, a node (or subgraph) removal command will be sent to the display server. The display server will remove the corresponding node (or subgraph) from the remote branch graph. The transfer to the display server of the lists of change operations, the lists of new nodes and new subgraphs, the node and subgraph removal commands are accomplished using one or more protocol requests including one or more batch protocol requests.

Case 3: The branch graph is currently live remote.

Summary: In this case, changes requested by the client are not only applied to the local branch graph but are also immediately sent to the display server to be applied to the remote branch graph. As used herein the phrase "immediately sent to the display server" means that the transfer is immediately initiated but does not imply that the data reaches the display server instantaneously.

A. Node Attribute Change (to an individual node in a local branch graph):

When the client modifies an attribute of some node in a local branch graph, the attribute change is applied to the local node. In addition, the change is immediately sent to the display server, and the display server applies the change to the corresponding remote node.

B. Node Attribute Query (from an individual node in a local branch graph):

When the client queries an attribute state of some node in a local branch graph, the query request is sent to the display server, and the display server returns the queried attribute value from the corresponding remote node.

C. Node Addition: (of an individual node to be added to a local branch graph):

When the client requests the addition of a node to a local branch graph, the new node is connected to the requested parent in the local branch graph. The node is then serialized and the serialized representation is sent to the display server. The display server reconstitutes the serialized representation into a corresponding remote node. The display server then connects the new remote node to the remote node which corresponds to the local parent node which was requested.

D. Subgraph Addition: (of an a multi-node subgraph to be added to a local branch graph):

When the client requests the addition of a subgraph to a local branch graph, the new subgraph is connected to the requested parent in the local branch graph. The subgraph is then serialized and the serialized representation is sent to the display server. The display server reconstitutes the serialized representation into a corresponding remote subgraph. The display server then connects the new remote subgraph to the remote node which corresponds to the local parent node which was requested.

E. Node Removal: (of an individual node to be removed from a local branch graph):

When the client requests the removal of a node from a local branch graph, the scene graph library disconnects the node from its parent node in the local branch graph. In addition, a node removal request is sent to the display server to remove the corresponding remote node. The display server removes this node from the remote branch graph.

F. Subgraph Removal: (of an a multi-node subgraph to be removed from local branch graph):

When the client requests the removal of a subgraph from a local branch graph, the scene graph library disconnects the subgraph from its parent node in the local branch graph. In addition, a subgraph removal request is sent to the display server to remove the corresponding remote subgraph. The display server removes this subgraph from the remote branch graph.

G. Disabling the Live Remote State: (making an entire local branch no longer live remote):

When the client requests that an entire branch graph be made no longer live remote, the display server is contacted. The display server serializes the state of the entire remote branch graph and sends this serialized representation back to the client in one or more protocol replies including one or more batch protocol replies. The client unserializes this representation and replaces the state of all nodes in the local branch graph with state from the corresponding nodes in the serialized representation. The branch graph is then disconnected from the local proxy universe object and the branch graph is no longer live remote.

Summary: When Changes Are Sent to the Display Server in Buffered Mode:

When the scene graph library is in Buffered Mode, changes which have been made to the local branch graph are sent to the display server in one or more protocol requests including one or more batch protocol requests when any one of a set of synchronization conditions is met. Examples of synchronization conditions include:

1. the client makes the local branch graph live remote, or
2. the client explicitly requests that pending changes be sent (the scene graph library provides an API routine which allows the client to request that pending changes should be sent), or
3. the client switches the scene graph library into unbuffered mode. Refer to the section "Mode Switching" below, or
4. the local buffer is full.

Unbuffered Mode Operation

When the state of the scene graph library is equal to "Unbuffered Mode", any client request for a change to the local branch graph results in the requested change being applied to the local branch graph and also in an immediate sending (i.e., an immediate initiation of transfer) of a protocol request to the display server so that the corresponding change may be applied to the remote branch graph. In one embodiment, the behavior of the scene graph library in Unbuffered Mode may be identical to the behavior of the scene graph library in Buffered Mode when the branch graph is live remote. (See Case 3 above.)

Mode Switching

When the scene graph library is in Buffered Mode, the client can change the buffering mode state variable to Unbuffered Mode by calling an API routine provided for this purpose. At this point, pending changes are sent to the display server and applied to the remote branch graph.

When the scene graph library is in Unbuffered Mode, the client can change the buffering mode state variable to Buffered Mode by calling an API routine provided for this purpose.

Summary of Client Behavior in One Set of Embodiments

In one set of embodiments, the behavior of the client may be summarized as follows.

In non-buffered mode, branch graph changes are sent immediately when the branch graph is live remote.

Buffered Mode Operation may be summarized as follows.

1. When is Buffered Mode Operation Enabled?
    A. For a Branch Graph
        When a branch graph is first created, Buffered Mode Operation is enabled for that branch graph. Buffered Mode Operation for a branch graph is disabled when the client makes the branch graph live remote. When the client makes the branch graph no longer live remote, Buffered Mode Operation is reenabled.
    B. Buffered Mode Operation for a node is enabled when one of the following conditions is true:
        The node is part of a branch graph which is in Buffered Mode.
        The user has explicitly enabled Buffered Mode for this node.

2. Recording Changes in Buffered Mode
    When Buffered Mode Operation is enabled on a branch graph (or node), changes to that branch graph (or node) are recorded locally, but are not sent to the display server until a synchronization condition occurs.

3. Change Recording Methods
    There are several methods used to record changes, depending on the type of change:
    A. Adding or removing a node or subgraph
        The addition (or removal) is made to the local branch graph, and a description of the addition (or removal) is recorded in a per-branch-graph change store.
    B. Changing a Node Attribute
        If the node has never been live remote, node changes are recorded by directly changing the node state.
        If the node has been live remote in the past, there are several different possible methods of recording:
        1. Mark attribute as changed in the change store, and update the attribute state in the local node.
        2. Store a description of the change operation in the change store, and update the attribute state in the local node.

4. Change Store Representation
    A. The change store for branch graph changes may be:
        One per branch graph, or
        Null: in this case, no changes are recorded and synchronization causes the state of the entire branch graph to be sent to the display server.
    B. The change store for node attribute changes may be:
        One per branch graph, into which the change records for all node attribute changes are stored, or
        One per node, into which the change records for attribute changes for that node are stored, or
        Null: in this case, no changes are recorded and synchronization causes the state of the node to be sent to the display server.

5. Synchronization
    A. Synchronizing an entire branch graph:
        When a synchronization condition for a branch graph occurs, any changes which have been recorded for this branch graph since its last synchronization are sent to the display server and are applied to the remote copy of the branch graph.
    B. Synchronizing an individual node:
        When a synchronization condition for a node occurs, any changes which have been recorded for this node since its last synchronization are sent to the display server and are applied to the remote copy of the node.

6. Synchronization Conditions
    A. For a branch graph:
        The client sends the recorded changes for a branch graph to the server when any of the following conditions occur:
        1. The branch graph is made live remote.
        2. The client switches the state of the branch graph from Buffered to Non-buffered operation
        3. The client explicitly requests synchronization of the branch graph.
        4. The amount of space allocated for the change store of this branch graph is full.
    B. For a node:
        The client sends the buffered changes for a node to the display server when any of the following conditions occur:
        1. The branch graph of the node is made live remote.
        2. The client switches the state of node from Buffered to Non-buffered operation
        3. The client explicitly requests synchronization of the node.
        4. The amount of space allocated for the change store of this node is full.
        5. The amount of space allocated for the change store of this node's branch graph is full.

7. When Buffered Mode Operation for a node is enabled, node attribute queries may be sent to the display server.

Embodiments of a Remote Scene-Graph Based Graphics API

Part I—Introduction

1. Introduction

In one set of embodiments, a remote scene-graph based graphics API (RSGA) may be constructed by adding a new set of features to an existing scene-graph based graphics API (SGA). Java3D™, OpenInventor, Performer, Open Scene Graph and JSR184 are examples of scene-graph based graphics APIs. In other embodiments, the RSGA may be constructed without relying on a pre-existing SGA.

The RSGA provides a graphics library on which 3D widgets and 3D applications can be built.

In various embodiments of a 3D window system (WS3D), there is a "display server" component which maintains a scene graph containing all of the windows on a desktop and their contents. WS3D-unaware applications, e.g., conventional X11 applications and OpenGL applications, are represented by a quad in the scene graph and their rendering is captured into a texture map which is mapped onto this quad. WS3D-unaware applications are also referred to herein as conventional applications.

In addition, the scene graph includes objects from "WS3D-aware" applications. These applications express their window contents using the RSGA. These applications may be configured to draw their contents directly onto the root window of the desktop: the windows created by these applications "float" in the root window along with other top-level windows. (See section 7.2 for alternate embodiments.) By floating it is meant that these windows do not necessarily have a rectangular boundary. Their individual objects appear to be part of the overall windowing environment. The event handling for these windows is sensitive to the silhouette of the scene graph objects.

For example, in a rotary CD player application, if one clicks inside a compact disc (CD) the application receives the event. But if one clicks outside the boundary of a CD, the window behind the CD receives the event. (In some embodiments, WS3D-aware windows may participate in physics simulation effects, such as windows bouncing off of each other.)

A 3D window system may include a window system server (e.g., an X11 server). In one set of embodiments, the display server lives in a separate process from the window system server. In other embodiments, the display server may live inside the window system server. Regardless of where the display server actually lives, the display server is in a separate process from the client applications.

Java3D was designed for applications to render the contents of a virtual universe into a canvas (or window) owned by the application. In various embodiments, the 3D window system may be configured so that the canvas is the root window (or alternatively, a full-screen child of the root window which is made to behave like the root window as described in section 7.2) and the display server process is owner of this canvas, and the only one allowed to draw to this canvas. Therefore, client applications are responsible for telling the display server what to draw. The RSGA may provide a means for accomplishing this.

In one embodiment, the RSGA is a set of new APIs added to Java3D™ along with Java3D implementation changes. These API changes may be added to the Java3D core APIs.

In various embodiments, the RSGA allows a client application to create a universe object which corresponds to a universe object in another process running either on the local machine (i.e., the machine on which the client application is executing) or on a remote machine.

WS3D-aware applications may make contact with a universe object provided by the display server process. The RSGA provides mechanisms for attaching client-created branch graphs to the display server's universe, thereby making them visible on the root window.

The RSGA allows client applications to describe the contents of 3D windows.

In the embodiments described below in sections 2 through 12, the RSGA does not support the notion of a 3D window. This abstraction may be provided by layers of software which are built on top of the RSGA. For example, there may be a client-side toolkit layer (built on top of the client-side of the RSGA) which talks to a window manager in order to create a 3D window, size it, position it within the window stack, etc. These types of operations may take place using a supplementary protocol, outside the scope of the RSGA. (See section 7.2 for a definition of window manager.)

Note that the window manager may be implemented in the display server. Alternatively, the window manager may itself be an RSGA client which lives in a process separate from the display server. In the case where the window manager resides in the display server, the window manager may be built on top of the server-side of the RSGA.

2. Features of the Remote Scene-Graph Based Graphics API (RSGA)

RSGA may provide services for:
  A. Connecting to the remote universe inside the display server.
  B. Attaching client branch graphs to the remote universe, thus making them "live remote".
  C. Changing the attributes of nodes in a live remote branch graph.
  D. Adding nodes to a live remote branch graph.
  E. Deleting nodes from a live remote branch graph.
  F. Executing behaviors remotely in the display server process.

Part II—Client Model

This section presents a model of the means by which client applications interact with the RSGA. Part III describes embodiments for the implementation of this model.

Many of the embodiments described below are described in terms of the X11 Window System as the underlying conventional 2D window system. However, other embodiments are contemplated which use other choices for the underlying conventional 2D window system.

In addition, the discussion below assumes that the scene-graph based API (SGA) is built on top of Java™. However, other embodiments are contemplated in which the SGA is built on top of languages other than Java.

3. Client Model Overview

In some embodiments of the 3D window system, there is one display server process per X11 display. Each display server has one SimpleUniverse object for each X11 screen of a display. (The SimpleUniverse object is familiar to users of Java3D.) Branch graphs for both conventional windows and WS3D-aware windows are attached to these universes. When a window is first created and mapped onto a screen, the appropriate geometry and appearances for that window are transmitted to the display server and attached as a subgraph to the universe for that screen.

Note: the embodiments described below do not deal with multiple screens. However, embodiments supporting multiple screens are a natural extension of the inventive principles described herein.

Each display server advertises a connection service which allows clients to create a client proxy object which corresponds to the display server's universe. The RSGA provides a new type of universe class, which is a subclass of SimpleUniverse, which establishes the connection and instantiates the "proxy universe" object on the client side. In one set of embodiments, the client need only supply the X11 display string for the display and the RSGA will figure out which display server is associated with that display.

(In one embodiment, the RSGA may also provide a subclass of VirtualUniverse so that a proxy version of this class is available to clients.)

Next, the client creates a branch graph as usual. The topmost BranchGroup in the branch graph is called the "root branch group." The Java3D objects that are created directly by the client are called the client branch graph.

Once the client branch graph has been created, the client then invokes the ProxyUniverse.addBranchGraph method, supplying the root branch group as the argument. This causes copies of all the nodes in the branch graph to be sent to the display server, where they are received by the display server, reconstituted into a branch graph, and attached to the remote universe. This makes the branch graph visible on the screen.

At this point the state of the branch graph is said to be "live remote."

The client may make changes to a client branch graph when it is live remote. Methods associated with the proxy universe object guarantee that the corresponding changes are made to the remote branch graph. For example, when the client makes changes to the attributes of objects in the client branch graph, the same changes are made to the attributes of the corresponding remote branch graph objects. If the client adds new nodes to the client branch graph, copies of the these nodes (and all of their subnodes) are sent to the display server and are instantiated as remote objects and then added to the remote branch graph. Likewise, if the client detaches nodes from the client branch graph, the corresponding remote nodes are detached from the remote branch graph. (These reference-less remote nodes will ultimately be garbage collected).

When the client detaches a root branch group from the proxy universe, the entire corresponding remote branch graph is detached from the remote universe. The branch graph disappears from the screen and the nodes in the remote branch graph will eventually be garbage collected. Subsequent node attribute changes, as well as node additions and deletions, are applied to the client branch graph. These changes are not sent to the display server until a synchronization condition occurs.

If a client subsequently reattaches a detached branch graph to the proxy universe, the current state of all objects in the branch graph may be sent to the display server and instantiated as objects and attached to the remote universe. Thus, any changes which have been made to the branch graph while it was detached will now be reflected in the remote branch graph.

4. Behavior Model 4.1 Server-side Behaviors Only

In one set of embodiments of the RSGA, all behaviors are executed remotely, that is, they are executed in the display server. This policy facilitates smooth animation. Many animation behaviors use wakeup conditions of WakeupOnElapsedFrames(0) to update the scene graph in a way that is frame-synchronized. Animations that don't use this type of synchronization can tend to be "jerky" or "choppy." It is not efficient to implement these types of behaviors on the client side. To do so would mean that the display server would need to notify all clients that have frame-synchronous behaviors at the start of the frame. All of these behaviors would need to execute their scene graph changes before the rendering of the frame could proceed. This "round trip" communication to multiple clients would significantly decrease the achievable frame rate. Therefore, all behaviors in a live remote scene graph may be executed on the display server side.

To achieve this policy, the Java byte codes for a behavior are made available to the Java Virtual Machine (JVM) in the display server process.

4.2. Handling Client Code in Branch Graphs

This section defines the behavior of the RSGA when user-extended classes are encountered in a branch graph which is attached to a remote universe. There are a variety of security and robustness issues that can arise when such classes are present in a branch graph. This section deals with these issues.

4.2.1. Handling Client-Extended Nodes

Client subclasses of Java3D core and utility classes are referred to herein as "client-extended nodes". These types of nodes may cause a variety of problems when they are present in a live remote branch graph. For example, they can invoke methods for classes which don't exist on the server side; they can have methods that get stuck in infinite loops; they may attempt to access protected display server resources, etc.

It is not critical for WS3D-aware applications to create such nodes. There are various ways in which client code can be kept separate from the objects which are made live remote. Therefore, in one set of embodiments, the RSGA will not permit such client-extended nodes to be present in a branch graph when it is attached to a proxy universe. The ProxyUniverse.attachBranchGraph method checks the fully qualified names of the classes of all nodes in the branch graph to ensure that they reside in the trusted Java3D packages (core or utilities). If a class is found which is not one of these trusted classes, an exception will be thrown.

Note: In alternative embodiments, the 3D window system may be configured to support client-extended nodes as well as client-extended behaviors. In one embodiment, the classes that support client-extended nodes coordinate with SceneGraphIO if they add any data members which need to be transmitted to the display server.

4.2.2. Handling Client-Extended Behaviors

It is desirable for the RSGA to support client-extended behaviors; this is the way the user animates objects. In order to implement this feature, the RSGA sends the Java byte codes for these classes from the client to the display server (Refer to Part III for implementation details.)

In some embodiments, client-extended behavior classes coordinate with SceneGraphIO if they add any data members which need to be transmitted to the display server.

Problems may arise if the client-extended behavior code invokes methods in other client classes that are not in any of the client's branch graphs. These problems may be averted by allowing the user to specify a list of utility classes on which behaviors in the branch graph depend that are not themselves attached to the scene graph. The proxy universe is informed of the list of utility classes prior to attaching any branch graphs which depend on these classes.

In one set of embodiments, if a behavior in one branch graph invokes methods in a behavior node in some other branch graph, the other branch graph must be attached before the dependent one is attached. Also, clients are not allowed to invoke methods in classes loaded by some other client.

When a client process disconnects from the display server, all of the classes which have been loaded (both behaviors and behavior utility classes) will be unloaded.

Also, there is a need for a method to detect and handle "rogue" behaviors. A rogue behavior is one whose processStimulus method never returns or whose code attempts to access protected resources. These problems may occur because of a bug in the behavior's implementation, or, they may occur because the behavior was maliciously written to do so.

The issue of limiting access to protected resources can be handled by giving each client their own class loader in the display server and by assigning this class loader a Java security manager with limited permissions.

Let's call a behavior whose processStimulus method never returns a "runaway" behavior. It would be desirable to find a way to identify runaway behaviors and to kill them without disturbing the execution of any of the other behaviors in a live remote branch graph. It would also be desirable to notify the client when such a runaway behavior is detected. Unfortunately, it is difficult to detect runaway behaviors. For example, it is difficult to differentiate a runaway behavior from a behavior that is doing useful work for a long period of time.

In some embodiments, a processStimulus timeout value may be specified. A timeout value in the range of 2 to 3 seconds may be sufficiently large for many applications. The timeout may be measured in process user time, not system time, to avoid a heavy system load from incorrectly triggering a timeout. In general, the timeout value $T_{MAX}$ is set sufficiently large (e.g., $T_{MAX}$=3 seconds) so that if a processStimulus method does not return within time $T_{MAX}$ it is very likely trapped in an infinite loop. Although, it is noted that the scene graph may be extremely complicated in which case a behavior could be doing something involving lots of nodes of the scene graph and end up taking more than $T_{MAX}$=3 seconds. But this is not very likely to happen in the environment of the 3D window system.

(In one embodiment, the client's Java security manager forbids socket creation. Thus, it will not be possible for the processStimulus method to be engaged in open-ended communications through a socket.)

The timeout may be measured in process user time. Furthermore, the timeout value may be user configurable. If the user knows that he/she is running applications having behaviors whose processStimulus methods take a long time, he/she can increase the timeout value.

4.3. Reporting Run-Time Exceptions to Clients

In one set of embodiments, there are two types of run-time exceptions which can occur in the display server during execution of a program which uses the RSGA: synchronous and asynchronous. A synchronous exception is one which occurs when the client invokes a method on a client node which then invokes the same method on the corresponding remote node. Conversely, an asynchronous exception is one which occurs during behavior execution. An asynchronous exception is not related to any client method invocation.

An example of an asynchronous exception is a situation in which a client-extended behavior being executed by the display server's behavior execution thread invokes methods for an object that doesn't exist in the display server. In this case an asynchronous exception is thrown.

A synchronous exception which occurs during the execution of a remote method is reported back to the client method which invoked it. This causes the client method to throw an exception of an appropriate type, if not the exact same type.

In order to be notified of asynchronous exceptions the client creates an instance of BehaviorExceptionListener and registers it with the proxy universe with addBehaviorExceptionListener (see below).

5. Java3D API Changes

This section specifies two changes to the Java3D specification in order to support the RSGA. One change is the addition of two new classes. The other change is a tightening-up of specification language regarding who can post to a behavior.

5.1. ProxyUniverse

In one set of embodiments of the RSGA, there may be two new API classes which are added to core Java3D: ProxyUniverse and BehaviorExceptionListener.

The following is one possible realization of ProxyUniverse:

class j3d.ProxyUniverse extends j3d.SimpleUniverse {
    //Constructs a proxy universe connected to the remote
    //universe associated with the given X11 display. The
    //format of displayString is similar to X11 DISPLAY
    //environment string, but without the ".<screen-number>"
    //portion. Specifically, the format of displayString is:
    //[<host>][:<displayNum>]. Both halves are optional:
    //if <host> is not provided, the local host is assumed
    //and if:<displayNum> is not provided, display number
    //is assumed.
    ProxyUniverse (String displayString);
    //Registers an object which listens for exceptions which
    //occur during behavior execution.
    void addBehaviorExceptionListener (BehaviorExceptionListener listener);
    //This method adds one class to the list of behavior utilities.
    void addBehaviorUtility (Class classObj)
    //This method adds a list class to the list of behavior utilities.
    //The elements of the list are of type Class.
    void addBehaviorUtilities (List classList)
    //This method adds all the classes in ajar file to the list
    //of behavior utilities.
    void addBehaviorUtilities (Url jarUrl)
    //Removes a class from the list of behavior utilities.
    void removeBehaviorUtility (String className)
    //Removes a list of classes from the list of behavior utilities.
    //The elements of the list are of type String.
    void removeBehaviorUtility (List classNameList)
}

Note: In one embodiment of the RSGA, only remote SimpleUniverses are supported. In another embodiment of the RSGA, the RSGA may be extended to provide a ProxyVirtualUniverse as well.

The following is one possible realization of BehaviorExceptionListener:

class j3d.BehaviorExceptionListener {
    //This method is called whenever an exception occurs during
    //execution of a behavior.
    void exceptionThrown (Exception e, Behavior b);
}

Part III—Implementation Details for the RSGA

This section discusses the details on how to implement various embodiments of the RSGA.

7. Creating the ProxyUniverse 7.1. Establishing the Communication Channel

According to one embodiment, when the X server is started up, it will fork an associated display server process. The display server will initialize itself and then acknowledge to the X server that it is up and running. It will do this by sending a WS3D Extension request. This request will specify the port number that the display server is listening to for client connections. If the X server does not receive this request within an amount of time $T_{REQ}$ after forking the display server, it will kill the display server process and exit with an error.

When an RSGA client desires to make a connection with the display server, it creates a ProxyUniverse object and tells the ProxyUniverse object the hostname and display number. The ProxyUniverse constructor will open a connection to this X server (which may be on a remote machine) and will query the display server's connection port number via a WS3D Extension request. The constructor will then establish a socket connection with the display server using this port number.

If the client and host are on the same machine, a shared memory channel may be created instead of a socket connection. Hereafter this communication mechanism, whether realized by a shared memory channel or a socket connection, will be referred to as the "CommChannel".

The client and display server may communicate over the CommChannel using a wire protocol. This wire protocol will be referred to herein as the remote scene graph protocol (RSGP). The RSGP includes a set of display server requests which are sent by the client. In some embodiments, every request has the same two-word header: a 4-byte unsigned integer request code and a 4-byte unsigned integer request length (in bytes). This length does not include the header itself. Beyond the header, each request type may have its own unique format. After a request is received by the display server, a reply is sent to the client. The format and length of the reply depends on the request type. In one embodiment, the first word of all replies is an integer status code. One realization of the RSGP request codes, request formats, reply formats is defined in Appendix A.

In one set of embodiments, the RSGA uses remote method invocation (RMI) in addition to the RSGP. RMI stubs and method calls may be used to transmit branch graph changes to the display server when unbuffered mode is enabled.

In an alternative set of embodiments, new RSGP requests are defined to handle the transmission of branch graph changes to the display server and thus, RMI may be eliminated from the RSGA. These alternative embodiments may be able to execute more quickly than those that are dependent on RMI.

In one embodiment, the RSGP is defined in a language-independent manner.

7.2. Creating a Display Server Root Window

The 3D window system may also include a 3D window manager. The 3D window manager imposes a policy on the appearance and behavior of the windows in the 3D environment. For example, according to one policy each window becomes transparent when the mouse cursor moves outside of the silhouette of the window so that the user(s) can see objects behind the window. According to another policy, windows may maintain total opacity independent of the position of the mouse cursor on the screen. Different users may have different policy preferences. Thus, the 3D window system may be configured so that the user can easily substitute one 3D window manager for another.

In one set of embodiments, the window manager of the 3D window system creates a window referred to herein as the display server root window. The display server root window is made to appear like the real root window. The 3D window system may use the display server root window as its canvas instead of the real root window. The display server root window is a full-screen child of the real root window. The window manager makes all client-created windows children of the display server root window and does not allow the display server root window to be unmapped. So, to the user, the display server root window appears to be the root window of the desktop. This set of embodiments may allow for more universal operability of the 3D window system because not all DDXs allow OpenGL drawing to the real root window. DDX is an acronym for "Device Dependent X". It applies to the device dependent layer of the X11 window server. A DDX for a particular graphics device is the device driver software for that device which lets the device independent part of X11 (DIX) communicate with that particular device.

8. Attaching Branch Group to ProxyUniverse

Each SceneGraphObject may have a new private proxyUniverse field. When a branch group is attached to a proxy universe, the proxyUniverse field of all nodes in the scene graph may be set to the proxy universe.

When ProxyUniverse.addBranchGraph is called, this method may first check proxyUniverse on the root branch group. If this is non-null, the method may return immediately. In other words, attempting to reattach an already attached live remote branch group does nothing.

8.1. SceneGraphObject IDs (SIDs)

SceneGraphObject may be modified to assign a unique ID to each instance. It may maintain a per-class counter in order to do this. In some embodiments, the SID field for an object is protected.

8.2. ProxyUniverse SID Registry

The ProxyUniverse may maintain a mapping between SIDs and the scene graph object they correspond to. When branch graphs are attached to the universe, these mappings may be created for all scene graph objects in the branch graph. When a branch graph is attached, it may be traversed. For each scene graph object, a mapping between its SID and the object may be added to the registry. When a branch graph is detached, the mappings for all objects in the graph may be removed from the registry.

8.3. Lazy Retained Objects

According to one set of embodiments, initially, when a Java3D object is created, the creation of its associated retained object will be deferred. Later if the object code attempts to send a message to a null retained object, the object will be created at that time. The type of retained object which is created will depend on the object's proxyUniverse field. If proxyUniverse is null, the object is not live remote and the retained object will be created locally within the client. If proxyUniverse is non-null, an RMI stub for the retained object of the client object's remote counterpart will be acquired from the display server and the retained field will be set to refer to this stub. Once the retained object has been created, the original message will be sent to it.

8.4. Sending the Behavior Utility Classes

The first part of branch group attachment to a proxy universe is to send the behavior utility classes. All of the behavior utility classes and jar files which have been registered with the proxy universe that have not yet been sent to the display server are sent at this point. For individual classes, the classes are serialized, sent over the CommChannel with an ExportClass request. The display server will unserialize the class and load it (e.g., using a class loader with a restrictive security manager).

Each client may be given its own copy of the class loader so as to prevent clients from accessing each others scene graph resources.

For jar files, the client's class path is searched until the jar file is found, a file is opened to it and the bytes are read in and sent over the CommChannel using the ExportJar request. This byte stream may be received by a custom class loader that interprets jar file format and unserializes and loads classes appropriately.

In one embodiment, once a class or jar file has been transmitted to the display server, it is marked as loaded. If subsequent branch graphs are attached, only the unloaded ones will be transmitted.

8.5. Sending the Branch Graph

A modified version of the scenegraph.io package may be used to serialize the branch graph so it can be sent over the CommChannel. But prior to serializing the branch graph, any client-extended behavior classes which appear in the branch graph are transmitted to the server.

8.5.1. Sending Client-Extended Behavior classes

A new static int field may be added to the behavior class: Client Behavior ID (CBID). Initially this field may be null. Null indicates that the class has not yet been sent to the display server. Non-null indicates that the class has been sent to the display server. (Only client-extended behavior classes will be sent to the display server, so this field will always be null for built-in behavior classes. A behavior class is said to be "built-in" if the behavior class is one of the Java3D core or utility classes).

The first thing which is done after the behavior utility classes are sent is the branch graph is traversed to find client-extended behaviors which have not yet been sent to the display server. Each time a behavior is found during this traversal if its class is not built-in, the behavior's CBID field is checked. If this field is non-null, the behavior is ignored; the behavior class has already been sent. But if the field is null, the class is sent.

The class is serialized and its bytes are sent over the CommChannel using the ExportClass request. The display server unserializes the class, causing it to be loaded by the class loader. The display server assigns it a unique CBID (that is, unique within the client) and returns this ID in the reply. The client sets the CBID field of this class to an Integer which wraps the ID.

Note: if, during this traversal, any client-extended classes are found which are not behaviors, an exception may be thrown.

8.5.2. Modifications to scenegraph.io

A few modifications are made to scenegraph.io in order to properly serialize the branch graph:

1. SceneGraphObjectState will be modified to also serialize the SID field of a SceneGraphObject.
2. BehaviorState will be modified to check whether the behavior is built-in. If so, the usual class code will be sent. If not, an indication that this is a client-extended behavior will be sent. The CBID will also be sent.
3. For each unique SID which is sent, a mapping between the SID and the scene graph object is added to a Client Object Registry contained in the ProxyUniverse. (This will be used later to detach a branch graph).

8.5.3. Serializing and Deserializing the Branch Graph

After all client-extended behaviors used by the branch graph have been exported to the display server, the branch graph will be serialized and the resulting byte stream will be sent over the CommChannel using the AttachBranchGraph request. The byte stream will be received by the display server and the branch graph will be reconstituted on the display server side. For each scene graph object which is recreated, the LookupRemoteNode registry for the client will be updated with a mapping between the object's SID and references to both the RSGA object and its retained object. This registry will later be used to create RMI stubs on the client side for various scene graph objects. Refer to Section 10.1 for details.

Once the branch graph has been reconstituted in the display server, the display server attaches the graph to the remote universe. The display server also maintains a per-client list of all branch graphs that client has attached to the remote universe. This is used later in cleaning up display server memory resources belonging to a client.

8.5.4. Handling Exceptions

If, during the process of reconstituting the branch graph, the AttachBranchGraph request handler encounters an exception, it will report a code for this exception in the reply status. If addBranchGraph on the client side receives a reply with a status other than Success, it will throw the appropriate exception.

An example of such an exception is if the client fails to export a behavior utility class used by a behavior in the graph. When the scene graph is being reconstituted, when scenegraph.io attempts to instantiate this behavior, the new operator will fail with ClassNotFound.

8.5.5. Marking Nodes Live Remote

In one set of embodiments, the final step of branch graph attachment is to traverse the client branch graph and do the following to each node:
  A. Set the (new) proxyUniverse field to the proxy universe object.
  B. Set the object's retained field to null.

9. Detaching a Branch Graph from ProxyUniverse

When ProxyUniverse.removeBranchGraph is called, the detachment process is very similar to attachment but it works in reverse. The remote version of the branch graph is serialized and sent back to the client. Specifically, the following steps occur:

A. The client sends the DetachBranchGraph request to the display server with the SID of the branch graph to be removed. If this SID is a valid branch graph, the display server will use scenegraph.io to serialize the branch graph and send the byte stream back in the request reply. (The display server waits until the end of the frame before it does this).
  Note: this type of reply has an unbounded length. The actual reply length field is 0 and a special end-of-stream code signals the end of the reply.
  Note: there is no need for the display server to send behavior utility or client-extended behavior classes back; they are already in the client.
  B. The client receives this reply and reconstitutes the scene graph from the byte stream using a modified version of scenegraph.io. In this version, when the byte stream is unserialized, it does not create new objects; instead it uses the Client Object Registry to map the SID from the byte stream into the corresponding client-scene graph object. It then reads the bytes from the stream and uses these to set the attributes of these objects. After this step, the client's version of the branch graph will have the same structure and node attributes as the remote branch graph had just before it was detached.
  C. After sending the reply, the display server detaches the branch graph from the remote universe. In addition, for all nodes in the graph, it deletes the mappings from the LookupRemoteNode registry. (This makes the remote nodes subject to garbage collection).
  D. The client traverses the branch graph and sets all of the proxyUniverse fields to null. In addition, all of the retained fields of all nodes are also set to null. This discards any RMI retained stubs which may have been created. If the attributes of a node are modified while the node is detached from the remote universe, a new client retained object will be created as needed.
  E. Finally, all nodes in the scene graph are deleted from the SID Registry of the ProxyUniverse.

10. Modifying a Live Remote Branch Graph

10.1. Modifying Node Attributes

This section describes how node attribute changes on the client side will be propagated to the retained object of the corresponding remote node when the branch graph is live remote.

10.1.1. The Display Server's LookupRemoteNode RMI Registry

The display server may support an RMI registry to allow the client to create RMI stubs which are proxies for the retained objects of live remote Java3D nodes.

This registry may be created when the display server is first started up. The name of this registry is: "<displayNum>.WS3DLookupRemoteNode".

When the client ProxyUniverse is created, an RMI stub for this service may be created by calling:

String url="mi:"+hostName+"."+displayNum+"/";
WS3DLookupRemoteNode lookupRemoteNode= (WS3DLookupRemoteNode)
   Naming.lookup(url+"WS3DLookupRemoteNode");

This creates an RMI stub in the client space which corresponds to a WS3DLookupRemoteNodeImpl object in the display server. Both the client and server side objects implement the following interface:

interface WS3DLookupRemoteNodeInterface {
   //Given a scene graph object ID (SID), return an RMI stub for
   //the corresponding remote scene graph object.
   SceneGraphObjectInterface getSceneGraphObject (int sid);
   //Given a scene graph object ID (SID), return the
   //retained object for the corresponding remote scene graph
   //object.
   SceneGraphObjectRetainedInterface get
      Retained (int sid);
}

10.1.2. Using the Registry to Obtain a Retained RMI Stub

When the client code modifies an attribute of a live remote branch graph node, the Java3D node implementation sends messages to change attributes in its corresponding retained node. This is normal Java3D behavior. The RSGA adds a check for a null retained object prior to sending these messages. If the retained object is null, and the branch graph is live remote, the node's class code calls:

this.retained=
   this.proxyUniverse.lookupRemoteNode.getRetained (this.sid);

This will return the desired RMI stub.

10.2. Adding a Subgraph

If a subgraph (including one or more nodes) is added to a live remote branch graph, the subgraph is sent to the display server in much the same way that a root branch group is attached to the remote universe:

1. Any behavior utility classes which have been newly defined since the last branch graph was attached are sent using ExportClass.
2. Any client-extended behaviors in the branch graph which have not been exported to the display server are exported now.
3. The subgraph is serialized via scenegraph.io and sent using the AttachSubgraph request. The SID of the parent node is sent as an argument.
4. The display server receives the byte stream and uses scenegraph.io to unserialize it.
   The LookupRemoteNode registry is used to map the parent SID to the parent node. The reconstituted remote subgraph is then attached to the parent node.
5. Finally, the client subgraph is traversed and the proxyUniverse field of each node is set to the proxyUniverse of the parent node. And the node's retained field is set to null.

10.3. Deleting a Subgraph

If a subgraph is removed from a live remote branch graph, the current state of the subgraph is sent by the display server back to the client in much the same way that a root branch group is removed from the remote universe:

1. The client sends a DetachSubgraph request with the SID of the parent node. If this SID is a valid branch graph, and if it is indeed attached to the specified parent node, the display server will use scenegraph.io to serialize the branch graph and send the byte stream back in the request reply. (The display server waits until the end of the frame before it does this).
2. The client receives this reply and reconstitutes the subgraph from the byte stream using the same modified version of scenegraph.io that is used to detach a branch graph from the remote universe.
3. After sending the reply, the display server detaches the subgraph from the parent node. In addition, for all nodes in the subgraph, it deletes the mappings from the LookupRemoteNode registry. (This makes the remote nodes subject to garbage collection).
4. Finally, the client traverses the subgraph and sets all of the proxyUniverse fields to null. In addition, all of the retained fields of all nodes are also set to null.

11. Remote Behavior Execution

In one set of embodiments, all RSGA behaviors are executed in the display server, both built-in and client-extended behaviors.

A watch dog timer may be configured to kill a behavior (or the entire client connection) if its processStimulus method runs too long. The timeout value is configurable via a set method of the ProxyUniverse class.

12. Exception Handling

Synchronous exceptions which occur during CommChannel interactions are detected by inspecting the reply status and throwing an appropriate exception if the status is not Success.

Synchronous exceptions during an RMI remote method invocation are handled by RMI itself.

Asynchronous exceptions are implemented in the following manner. When a proxy universe is created, and the CommChannel is established, another socket (or shared memory) connection is established between the client and the display server. A Client Exception Thread (CET) is created on the client side to listen to this channel for exception notifications. If an exception occurs in the display server which must be reported to a client, the display server sends a exception event over this socket. The CET receives this event and calls the remoteExeptionOccurred methods of all BehaviorExceptionListeners which have been registered with the proxy universe.

13. Display Server Memory Management

The display server makes the remote objects created by a particular client subject to garbage collection when the client breaks its connection. To this end, whenever the client connection is broken, the display server will traverse the list of attached branch graphs and detach them. Then, it will traverse the client's RemoteNode registry and delete all of the client's mappings. At this point, all of the remote objects which this client created will be subject to garbage collection.

Figure 10:
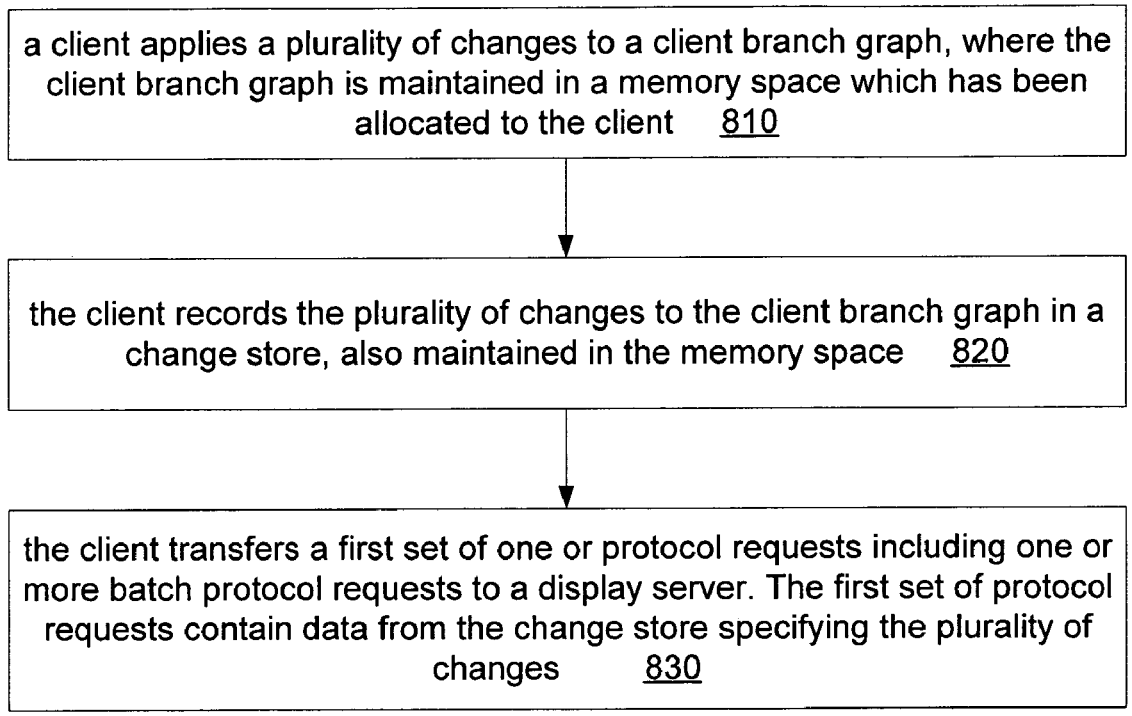
FIG. 10 illustrates one set of embodiments of a method for communicating branch graph changes to a display server.

FIG. 10 illustrates one set of embodiments of a method for communication branch graph changes to a display server.

In step 810, a client applies a plurality of changes to a client branch graph. The client branch graph is maintained in a memory space which has been allocated to the client.

In step 820, the client records the plurality of changes to the client branch graph in a change store, also maintained in the memory space.

In step 830, the client transfers a set of one or protocol requests including one or more batch protocol requests to a display server. The set of protocol requests contain data from the change store specifying the plurality of changes. The display server is configured to apply the plurality of changes to a remote branch graph.

Each of the batch protocol requests include two or more changes of said plurality of changes.

The display server may be further configured to attach the remote branch graph (after having applied the plurality of changes to the remote branch graph) to a scene graph and to render the scene graph.

In some embodiments, the client may also transmit a detachment request to the display server. The display server is configured to detach the remote branch graph from the scene graph in response to receiving the detachment request. The display server may be further configured to send the detached branch graph to the client.

The step 820, i.e., the step of recording the plurality of changes, may be performed during a buffered mode of operation.

In one embodiment, the client may perform the following additional steps:
 (a) determining that the buffered mode of operation has been disabled; and
 (b) transferring a separate protocol request to the display server for each change applied to the client branch graph after having determined that the buffered mode of operation has been disabled, where each separate protocol request specifies the corresponding change applied to the client branch graph.

Prior to steps 810-830, the client may:
 (a) create the client branch graph in the memory space; and
 (b) transfer an initial set of one or more protocol requests including one or more batch protocol requests to a display server, where the initial set of one or more protocol requests contain data specifying a copy of the client branch graph, wherein the display server is configured to receive the initial set of one or more protocol requests and construct the remote branch graph from the branch graph copy.

In one embodiment, the display server and client are processes executing on different computers. In another embodiment, the display server and client are processing executing on the same computer.

The one or more protocol requests may have a packet structure defined by the X11 client-server protocol. Of course, other protocols may be used instead of the X11 client-server protocol.

The display server may be configured to attach the remote branch graph to a scene graph in response to receiving a corresponding command from the client. The client branch graph is said to be live remote when the remote branch graph is attached to the scene graph. The client is configured to perform said transferring of the set of protocol requests containing said data in response to receiving a request to make to the client branch graph live remote.

In some embodiments, the client may be further configured to transfer a separate protocol request to the display server for each change applied to the client branch graph after having determined that the remote branch graph has been attached to the client branch graph.

Said data specifying the plurality of changes may include a description of an addition of a node or subgraph to the client branch graph in the change store.

In one embodiment, said data specifying the plurality of changes may include, for each node of the client branch graph that has been modified by said changes to the client branch graph, (a) a list of the node attributes which have been modified and (b) values of the attributes indicated by the list.

Said data specifying the plurality of changes may also include a list of identifiers identifying nodes and subgraphs that have been removed from the client branch graph.

In some embodiments, said data specifying the plurality of changes includes a list of nodes and subgraphs that have been added to the local branch graph.

In one embodiment, the client may be configured to perform the following additional steps:
 (a) determining that the buffered mode of operation has been disabled, and
 (b) in response to a determination that the buffered mode of operation has been disabled:
  recording changes to a selected subset of nodes in the client branch graph in the change store;
  sending the changes from the change store to the display server in a third set of protocol requests including one or more batch protocol requests; and
  separately sending each change that modifies any node in the client branch graph outside the selected subset to the display server.

Each node may have an attribute that determines whether the node belongs to the selected subset. The value of this attribute may be modifiable by an application program.

The client may be configured to make the client branch graph live remote by sending a request to the display sever directing the display server to connect the remote branch graph to a scene graph.

In one embodiment, said plurality of changes to the client branch graph may include changes to attributes of nodes of the client branch graph.

In some embodiments, the client may be configured to perform the following additional steps:
 (a) determining that a first node of the client branch graph has never been part of the client branch graph when the client branch graph was live remote; and
 (b) transferring an entire state of the node to the display server in response to said determination that the first node has never been part of the client branch graph when the client branch graph was live remote.

The client may be configured to perform said recording and said transferring (i.e., steps 820 and 830) for a plurality of client branch graphs. The client may maintain a separate change store for each branch graph.

In some embodiments, the change store may include a union of node change stores, one per node of the client branch graph, where changes to attributes of each node are stored in the corresponding node change store.

The client branch graph includes a plurality of nodes. In one set of embodiments, each node of the client branch graph includes a buffered changes attribute. The client may be configured to:
 (a) determine if the buffered changes for a first node is set to a first state in response to receiving a command to change an attribute of the first node;
 (b) transfer a singe protocol request corresponding to the command to the display server in the response to determining that the buffered changes attribute of the first node is set to the first state; and (c) record the change to the attribute in the change store in response to determining that the buffered changes attribute of the first node is set to a second state different from the first state.

In one embodiment, the client may be configured to transfer information representing changes that have accumulated for the first node from the change store to the display server in response to a determination that the buffered changes attribute of the first node has transitioned from the second state to the first state.

In some embodiments, the client may be configured to perform the following additional steps:

(a) marking a node of the client branch graph has having been modified by one of said plurality of changes;

(b) transferring an entire state of the node of the client branch graph to the display server in response to a synchronization condition for the node becoming true.

Figure 11:
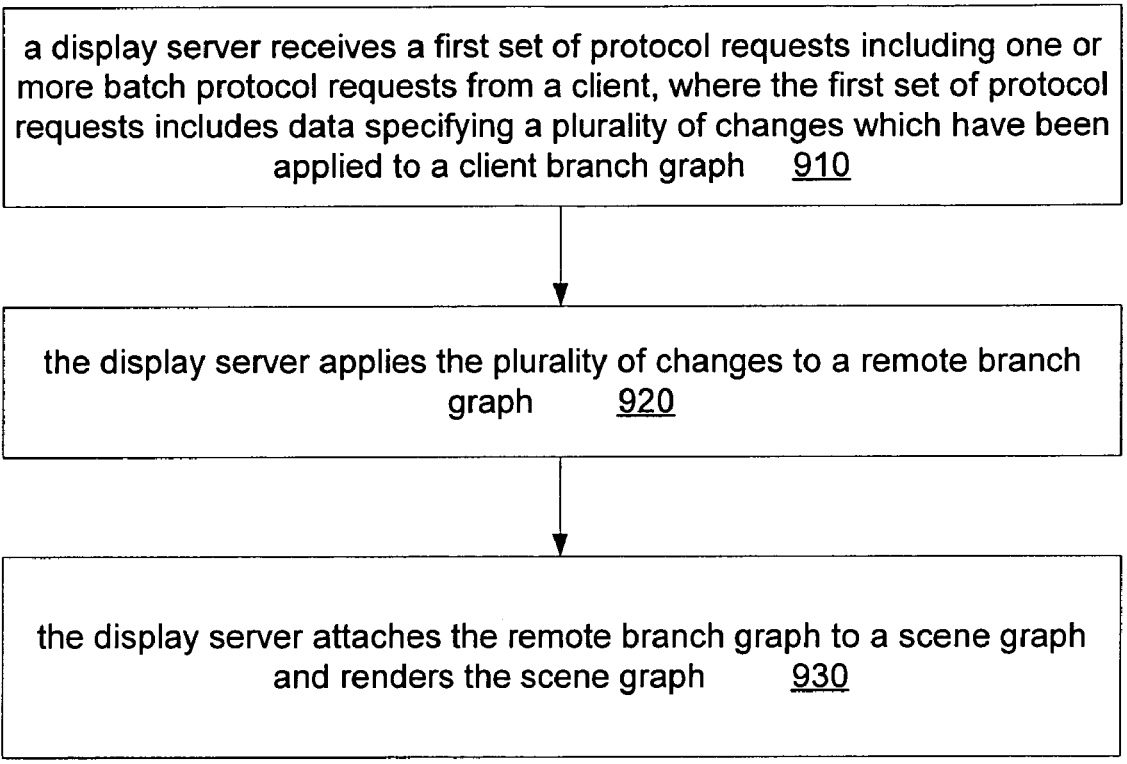
FIG. 11 illustrates one set of embodiments of a method for operating a display server.

FIG. 11 illustrates one set of embodiments of a method for operating a display server.

In step 910, a display server receives a set of one or more protocol requests including one or more batch protocol requests from a client. The set of one or more protocol requests includes data specifying a plurality of changes which have been applied to a client branch graph.

In step 920, the display server extracts the data from the set of one or more protocol requests and applies the plurality of changes to a remote branch graph.

In step 930, the display server attaches the remote branch graph to a scene graph and renders the scene graph.

In some embodiments, the display server may be additionally configured to perform the following steps:

(a) receiving an initial set of one or more protocol requests including one or more batch protocol requests from the client prior to receiving the set of protocol requests mentioned above in step 910, wherein the initial set of protocol requests contain a copy of the client branch graph;

(b) constructing the remote branch graph from the branch graph copy; and (c) attaching the branch graph copy to the scene graph.

The display server may be included as a part of a 3D window system.

The display server may be configured to maintain a plurality of remote branch graphs corresponding to one or more clients.

It is contemplated that any or all of the computational method embodiments described herein may be realized in the form of program instructions stored on computer readable memory media. Any of various computer readable memory media are contemplated.

Furthermore, it is contemplated that program instructions realizing any or all of the methods embodiments described herein may be stored in the memory of a computer system. A processor of the computer system may be configured to read the program instructions from the memory and execute the program instructions to implement any or all of the method embodiments described herein.

Example of a Remote Scene Graph Protocol (RSGP)

The start of all requests and replies may be 32-bit word aligned. Every request and reply may be padded out to a 32-bit boundary as necessary.

```
Status Codes
------------
0       Success
1       Exception: ClassNotFound
Render Requests
---------------
GetRenderRoot
    Opcode = 01
    Length (= 0)
    Reply:
        Status
        Window ID
ExportClass
    Opcode = 02
    Length
    Class name string (null terminated)
    (Byte stream of serialized class bytes)
    Reply:
        Status
        CCID
ExportJar
    Opcode = 03
    Length
    Jar name string (null terminated)
    (Byte stream of jar contents)
    Reply:
        Status
        Length
        (List of CCIDs)
AttachBranchGraph
    Opcode = 04
    Length
    (Byte stream of serialized branch graph)
    Reply:
        Status
DetachBranchGraph
    Opcode = 05
    Length (= 4)
    SID (of root branch group to be removed)
    Reply:
        Status
        Length (= 0)
        (Byte stream of serialized branch graph)
        <End-of-Stream code>
AttachSubgraph
    Opcode = 06
    Length
    Parent SID
    (Byte stream of serialized subgraph)
    Reply:
        Status
DetachSubGraph
    Opcode = 07
    Length (= 4)
    Parent SID
    Reply:
        Status
        Length (= 0)
        (Byte stream of serialized subgraph)
        <End-of-Stream code>
```

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as a network and/or a wireless link.

The various methods as illustrated in the Figures and described herein represent exemplary embodiments of methods. The methods may be implemented in software, hardware, or a combination thereof. The order of method steps may be changed, and various steps may be added, reordered, combined, omitted, modified, etc.

Various modifications and changes may be made as would be obvious to a person skilled in the art having the benefit of this disclosure. It is intended that the invention embrace all such modifications and changes and, accordingly, the above description is to be regarded in an illustrative rather than a restrictive sense.

What is claimed is:

1. A method, comprising:
    a client applying a plurality of changes to a client branch graph, wherein the client branch graph is maintained in a memory space which has been allocated to the client, wherein the client branch graph includes one or more nodes organized in a hierarchical structure, wherein at least one of the one or more nodes include graphics data;
    the client recording the plurality of changes to the client branch graph in a change store also maintained in the memory space;
    the client transferring a first set of one or more protocol requests including one or more batch protocol requests to a display server, wherein the first set of protocol requests contain data from the change store specifying the plurality of changes, wherein the display server is configured to apply the plurality of changes to a remote branch graph;
    wherein each one of said one or more batch protocol requests includes two or more changes of said plurality of changes, wherein the two or more changes of said plurality of changes indicate changes to one or more graphical objects for a scene graph, wherein the one or more graphical objects are described by the client branch graph, and wherein multiple changes to the scene graph are included in each one of the one or more batch protocol requests.

2. The method of claim 1, wherein the display server is further configured to attach the remote branch graph to the scene graph and to render the scene graph.

3. The method of claim 2 further comprising:
    the client transmitting a detachment request to the display server;
    wherein the display server is further configured to detach the remote branch graph from the scene graph in response to receiving the detachment request.

4. The method of claim 3, wherein the display server is further configured to send the detached branch graph to the client.

5. The method of claim 1, wherein said recording of the plurality of changes is performed during a buffered mode of operation.

6. The method of claim 5, wherein the method further comprises:
    the client determining that the buffered mode of operation has been disabled; and
    the client transferring a separate protocol request to the display server for each change applied to the client branch graph after having determined that the buffered mode of operation has been disabled, wherein each separate protocol request specifies the corresponding change applied to the client branch graph.

7. The method of claim 1 further comprising:
    the client creating the client branch graph in the memory space;
    the client transferring a second set of protocol requests including one or more batch protocol requests to a display server, wherein the second set of protocol requests contains data specifying a copy of the client branch graph, wherein the display server is configured to receive the second set of protocol requests and construct the remote branch graph from the branch graph copy.

8. The method of claim 1, wherein the display server and client are processes executing on different computers.

9. The method of 1, wherein the one or more protocol requests have a packet structure defined by the X11 client-server protocol.

10. The method of claim 1, wherein the display server is configured to attach the remote branch graph to the scene graph in response to receiving a corresponding command from the client, wherein the client branch graph is said to be live remote when the remote branch graph is attached to the scene graph, wherein the client is configured to perform said transferring of the first set of protocol requests containing said data in response to receiving a request to make to the client branch graph live remote.

11. The method of claim 10 further comprising: the client transferring a separate protocol request to the display server for each change applied to the client branch graph after having determined that the remote branch graph has been attached to the client branch graph.

12. The method of claim 1, wherein said data specifying the plurality of changes includes a description of an addition of a node or subgraph to the client branch graph in the change store.

13. The method of claim 1, wherein said data specifying the plurality of changes includes, for each node of the client branch graph that has been modified by said changes to the client branch graph, (a) a list of the node attributes which have been modified and (b) values of the attributes indicated by the list.

14. The method of claim 1, wherein said data specifying the plurality of changes includes a list of identifiers identifying nodes and subgraphs that have been removed from the client branch graph.

15. The method of claim 1, wherein said data specifying the plurality of changes includes a list of nodes and subgraphs that have been added to the client branch graph.

16. The method of claim 5 further comprising:
    the client determining that the buffered mode of operation has been disabled; and
    in response to a determination that the buffered mode of operation has been disabled:
        the client recording changes to a selected subset of nodes in the client branch graph in the change store;
        the client sending the changes from the change store to the display server in a third set of protocol requests including one or more batch protocol requests;
        the client separately sending each change that modifies any node in the client branch graph outside the selected subset to the display server.

17. The method of claim 16, wherein each node has an attribute that determines whether the node belongs to the selected subset, wherein the value of the attribute is modifiable by an application program.

18. The method of claim 1, wherein the client is configured to make the client branch graph live remote by sending a request to the display sever directing the display server to connect the remote branch graph to the scene graph; wherein said plurality of changes to the client branch graph include changes to attributes of nodes of the client branch graph.

19. The method of claim 18 further comprising:
determining that a first node of the client branch graph has never been part of the client branch graph when the client branch graph was live remote;
transferring an entire state of the node to the display server in response to said determination that the first node has never been part of the client branch graph when the client branch graph was live remote.

20. The method of claim 1, wherein the client is configured to perform said recording and said transferring for a plurality of client branch graphs, wherein the client maintains a separate change store for each branch graph.

21. The method of claim 1, wherein the change store includes a union of node change stores, one per node of the client branch graph, wherein changes to attributes of each node are stored in the corresponding node change store.

22. The method of claim 1, wherein the client branch graph includes a plurality of nodes, wherein each node of the client branch graph includes a buffered changes attribute; the method further comprising:
the client determining if the buffered changes for a first node is set to a first state in response to receiving a command to change an attribute of the first node;
the client transferring a singe protocol request corresponding to the command to the display server in the response to determining that the buffered changes attribute of the first node is set to the first state;
the client recording the change to the attribute in the change store in response to determining that the buffered changes attribute of the first node is set to a second state different from the first state.

23. The method of claim 22 further comprising:
transferring information representing changes that have accumulated for the first node from the change store to the display server in response to a determination that the buffered changes attribute of the first node has transitioned from the second state to the first state.

24. The method of claim 1 further comprising:
the client marking a node of the client branch graph as having been modified by one of said plurality of changes;
the client transferring an entire state of the node of the client branch graph to the display server in response to a synchronization condition for the node becoming true.

25. A computer-readable memory medium storing program instructions, wherein the program instructions are executable to implement the method recited in claim 1.

26. A system, comprising:
a processor; and
a memory storing program instructions, wherein the program instructions are executable by the processor to implement the method recited in claim 1.

27. A method, comprising:
a display server receiving a first set of one or more protocol requests including one or more batch protocol requests from a client, wherein the first set of one or more protocol requests includes data specifying a plurality of changes which have been applied to a client branch graph at the client, wherein each one of said one or more batch protocol requests includes two or more of the plurality of changes, wherein the two or more of the plurality of changes indicate changes to one or more graphical objects for a scene graph, wherein the one or more graphical objects are described by the client branch graph, and wherein multiple changes to the scene graph are included in each one of the one or more batch protocol requests;
the display server applying the plurality of changes to a remote branch graph, wherein the remote branch graph includes one or more nodes organized in a hierarchical structure, wherein at least one of the one or more nodes include graphics data;
the display server attaching the remote branch graph to the scene graph and rendering the scene graph.

28. The method of claim 27 further comprising:
the display server receiving a second set of one or more protocol requests including one or more batch protocol requests from the client prior to receiving the first set of one or more protocol requests, wherein the second set of protocol requests contain a copy of the client branch graph;
the display server constructing the remote branch graph from the branch graph copy;
the display server attaching the branch graph copy to the scene graph.

29. The method of claims 27, wherein the display server is part of a 3D window system.

30. The method of claim 27, wherein the display server is configured to maintain a plurality of remote branch graphs corresponding to one or more clients.

31. A computer-readable memory medium storing program instructions, wherein the program instructions are executable to implement the method recited in claim 27.

32. A system, comprising:
a processor; and
a memory storing program instructions, wherein the program instructions are executable by the processor to implement the method recited in claim 27.

* * * * *